United States Patent
Agesen et al.

(10) Patent No.: US 6,253,215 B1
(45) Date of Patent: Jun. 26, 2001

(54) METHOD, APPARATUS, AND ARTICLE OF MANUFACTURE FOR FACILITATING RESOURCE MANAGEMENT FOR APPLICATIONS HAVING TWO TYPES OF PROGRAM CODE

(75) Inventors: Ole Agesen, Franklin; David L. Detlefs, Westford; Derek R. White, Reading, all of MA (US)

(73) Assignee: Sun Microsystems, Palo Alto, CA (US)

( * ) Notice: Subject to any disclaimer, the term of this patent is extended or adjusted under 35 U.S.C. 154(b) by 0 days.

(21) Appl. No.: 09/134,548

(22) Filed: Aug. 17, 1998

(51) Int. Cl.⁷ ................................................. G06F 17/30
(52) U.S. Cl. ................................. 707/206; 395/705
(58) Field of Search ............................ 707/206; 395/205

(56) References Cited

U.S. PATENT DOCUMENTS

| | | |
|---|---|---|
| 4,757,438 | 7/1988 | Thatte et al. . |
| 4,907,151 | 3/1990 | Bartlett . |
| 4,920,483 | 4/1990 | Pogue et al. . |
| 5,043,870 | 8/1991 | Ditzel et al. . |
| 5,107,457 | 4/1992 | Hayes et al. . |
| 5,222,221 | 6/1993 | Houri et al. . |
| 5,301,288 | 4/1994 | Newman et al. . |
| 5,355,483 | 10/1994 | Seriet . |
| 5,408,650 | 4/1995 | Arsenault . |
| 5,535,329 | 7/1996 | Hastings . |
| 5,560,003 | 9/1996 | Nilsen et al. . |
| 5,561,786 | 10/1996 | Morse . |
| 5,566,321 | 10/1996 | Pase et al. . |
| 5,636,362 | 6/1997 | Stone et al. . |
| 5,813,031 | 9/1998 | Chou et al. . |
| 5,923,892 | * 7/1999 | Levy ................................ 385/800.31 |
| 5,937,193 | * 8/1999 | Evoy ........................................ 395/709 |
| 5,946,487 | * 8/1999 | Dangelo ................................. 395/705 |
| 5,974,544 | * 7/1999 | Jeffries ..................................... 713/1 |
| 5,999,732 | * 11/1999 | Bak et al. ............................... 395/705 |

OTHER PUBLICATIONS

Agesen, O. et al., "Garbage Collection and Local Variable Type–Precision and Liveness in Java TM Virtual Machines," ACM Sigplan Notices, U.S. Assoc. for Computing Machinery, N.Y., vol. 33, No. 5, May 1998, pp. 269–279.

(List continued on next page.)

Primary Examiner—Wayne Amsbury
(74) Attorney, Agent, or Firm—Finnegan, Henderson, Farabow, Garrett & Dunner, L.L.P.

(57) ABSTRACT

Methods, systems, and articles of manufacture consistent with the present invention provide a program component including a set of instructions native to the system, include in the set of native instructions an instruction to maintain information on use of a particular object, and permit reuse of memory resources corresponding to the particular object based on an indication from a source that the particular object is no longer being used, the source being different from any source used to provide information on use of objects associated with non-native instructions of the program component. Additionally, garbage collection is not permitted during native code operations to read or write data in object fields because during such operations an indication exists that such collection may be inaccurate and could possibly reclaim or relocate objects referenced by native code though not specified as such in the native code stack and global variables.

52 Claims, 8 Drawing Sheets

OTHER PUBLICATIONS

Diwan, A. et al., "Compiler Support for Grbage Collection in a Statically Typed Language," ACM Sigplan Notices, U.S. Assoc. for Computing Machinery, N.Y., vol. 27, No. 7, Jul. 1992, pp. 273–282.

Kazuhiro, Ogata, "The Design and Implementation of Home," ACM Sigplan Notices, U.S. Assoc. for Computing Machinery, N.Y., vol. 27, No. 7, pp. 44–54.

A. Diwan, E. Moss & R. Hudson, Compiler Support for Garbage Collection in a Statically Typed Language, ACM Sigplan, vol. 27, No. 7, Jul. 1992.

Gosling, James, "Java Intermediate Bytecodes," ACM Sigplan Workshop on Intermediate Representations, 1995, pp. 111–118.

Chambers, Craig, et al., "An Efficient Implementation of Self, a Dynamically–Typed Object–Oriented Language Based on Prototypes," Center for Integrated Systems, Stanford University, OOPSLA '89 Proceedings, Oct. 1–6, 1989, pp. 49–70.

Chung, Kin–Man and Yuen, herbert, "A 'Tiny' Pascal Compiler: the P–Code Interpreter," BYTE Publications, Inc., Sep. 1978.

Chung, Kin–Man and Yuen, Herbert, "A 'Tiny' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Mitchell, James G. Maybury, William, and Sweet, Richard, Mesa Language Manual, Xerox Corporation.

Pier, Kenneth A., "A Retrospective on the Dorado, A High–Performance Personal Computer," Xerox Corporation, Aug. 1983.

Pier, Kenneth A., "A Retrospective on the Dorado, A High–Performance Personal Computer," IEEE Conference Proceedings, The 10th Annual International Symposium on Computer Architecture, 1983.

Krasner, Glenn, "The Smalltalk–80 Virtual Machine" BYTE Publications, Inc., Aug. 1991, pp. 300–320.

Gosling, James et al., "The Java Language Specification," Addison–Wesley, 1996.

Lindholm, Tim and Yelling, Frank, "The Java Virtual Machine Specification," Addison–Wesley, 1996.

International Search Report, PCT/US98/13623, Jun. 30, 1998.

Wilson, P.R., et al., "Design of the Opportunistic Garbage Collector," Proceedings of the Object Oriented Programming Systems Languages An Applications Conference, New Orleans, vol. 24, No. 10, Oct. 1989.

MIT Scheme Reference, 11.5: Object Hashing, updated Oct. 27, 1994.

MIT Scheme Reference, 11.4.4: Address Hashing, updated Oct. 27, 1994.

McDaniel, Gene, "An Anaylsis of a Mesa Instruction Set," Xerox Corporation, May 1982.

Grehan, Rick, "If Memory Serves . . . ," BYTE Publications, Inc., Aug. 1989.

Grehan, Rick, "Virtually Virtual Memory," BYTE Publications, Inc., Sep. 1990.

Imai, Akira and Tick, Evan, "Evaluation of Parallel Copying Garbage Collection on a Shared–Memory Multiprocessor", IEEE Transactions On Parallel and Distributed Systems, vol. 4, No. 9, Sep. 1993.

Kuechlin, Wolfgang W. and Nevin, Nicholas J., "On Multi–Threaded List–Processing and Garbage Collection," IEEE, 1991.

Harbaugh, Sam and Wavering, Bill, "HeapGuard™ Eliminating Garbage Collection in Real–Time Ada Systems," Integrated Software, Inc.

Bott, Ed, "Windows' Invisible Wall: The 64K Barrier," PC Contact, Mar. 1994.

Karen, et al., "Garbage Collection for Prolog based on WAM," Communications of the ACM, vol. 31, Issue 6 , Jun. 1988.

Wallace, David V., and Tiemann, Michael, "Simple Garbage Collection in G++," Cygnus Support.

Caro, Alexander, "A Novel 64 Bit Data Representation for Garbage Collection and Synchronizing Memory", Computation Structures Group Memo 396, Apr. 9, 1997.

Courts, Robert, "Improving Locality of Reference in a Garbage–Collecting Memory Management System," Communications of the ACM, vol. 31, No. 5, Sep. 1988.

Moon, David A., "Garbage Collection in a Large Lisp System," Association for Computing Machinery, 1984.

Barrett, David A., "Improving the Performance of Conservative Generational Garbage Collection," Technical Report CU–CS–784–95, University of Colorado at Boulder, Sep. 1995.

Aho, Alfred V., Sethi, Ravi, and Ullman, Jeffrey D., "Compilers: Principles, Techniques, and Tools," Addison–Wesley Publishing Company, 1988; Copyright© 1986 by Bell Telephone Laboratories, Inc.

Jones, Richard, and Lins, Rafael, "Garbage Collection: Algorithms for Automatic Dynamic Memory Management," John Wiley & Sons, 1996.

Booch, Grady, "Object Oriented Design With Applications," The Benjamin/Cummings Publishing Company, Inc., 1991.

Hölzle, Urs, "A Fast Write Barrier for Generational Garbage Collectors," OOPSLA '93 Garbage Collection Workshop, Washington, DC, Oct. 1993.

"GC FAQ—draft," http://www.centerline.com/people/chae/GC/GC–faq.html, Jan. 6, 1997.

Shaw, Richard H., "An Introduction to the Win32 API (Programming Specification, Application Programming Interface, Power Programming)," PC Magazine, Apr. 26, 1994.

Detlefs, David L., Concurrent Garbage Collection for C++, School of Computer Science, Carnegie Mellon University, Pittsburgh, PA, May 4, 1990, pp. 1–46.

Bartlett, joel F., "Compacting Garbage Collection with Ambiguous Roots," Digital Equipment Corporation, Feb. 1988, pp. 1–35.

Ferreira, Paulo, "Garbage Collection in C++, Position Paper foro the OOPSLA '91 Workshop on Garbage Collection," Jul. 1991, pp. 1–6.

Bartlett, Joel F., Mostly–Copying Garbage Collection Picks Up Generations and C++, WRL Technical Note TN–12, Digital Equipment Corporation, Oct. 1989, pp. 1–13.

Boehm, Hans–Juergen and Weiser, Mark, "Garbage Collection in an Uncooperative Environment," Software—Practice and Experience, vol. 18(9), John Wiley & Sons, Ltd., Sep. 1988, pp. 807–820.

Caplinger, Michael, "A Memory Allocator with Garbage Collection for C," Bell Communication Research, USENIX Winter Conference, Dallas, Texas, Feb. 9–12, 1988, pp. 325–330.

Diwan, Amer, et al., "Compiler Support for Garbage Collection in a Statically Typed Language," Object Systems Laboratory, Dept. of Computer Science, U. of Massachusetts, Amherst.

Wilson, Paul R., et al., "Dynamic Storage Allocation: A Survey and Critical Review," Department of Computer Sciences, University of Texas at Austin, Austin, Texas.

* cited by examiner

METHOD, APPARATUS, AND ARTICLE OF MANUFACTURE FOR FACILITATING RESOURCE MANAGEMENT FOR APPLICATIONS HAVING TWO TYPES OF PROGRAM CODE

BACKGROUND OF THE INVENTION

A. Field of the Invention

This invention generally relates to memory management for computer systems and, more particularly, to a methodology for managing memory resources for an application program having two types of program code, native code executing directly in an operating environment and target code for execution by an abstract computing machine associated with the operating environment and responsible for memory management for both types of code.

B. Description of the Related Art

Object-oriented programming techniques have revolutionized the computer industry. For example, such techniques offer new methods for designing and implementing computer programs using an application programming interface (API) associated with a predefined set of "classes," each of which provides a template for the creation of "objects" sharing certain attributes determined by the class. These attributes typically include a set of data fields and a set of methods for manipulating the object.

The Java™ Development Kit (JDK) from Sun Microsystems, Inc., for example, enables developers to write object-oriented programs using an API with classes defined using the Java™ programming language. The Java programming language is described, for example, in a text entitled "The Java Language Specification" by James Gosling, Bill Joy, and Guy Steele, Addison-Wesley, 1996. The class library associated with the Java API defines a hierarchy of classes with a child class (i.e., subclass) inheriting attributes (i.e., fields and methods) of its parent class. Instead of having to write all aspects of a program from scratch, programmers can simply include selected classes from the API in their programs and extend the functionality offered by such classes as required to suit the particular needs of a program. This effectively reduces the amount of effort generally required for software development.

The JDK also includes a compiler and a runtime environment with a virtual machine (VM) for executing programs. In general, software developers write programs in a programming language (in this case the Java programming language) that use classes from the API. Using the compiler, developers compile their programs into "class files" containing instructions for an abstract computing model embodied by the Java VM; these instruction are often called "bytecodes." The runtime environment has a class loader that integrates the class files of the application with selected API classes into an executable application. The Java VM then executes the application by simulating (or "interpreting") bytecodes on the host operating system/computer hardware. The Java VM thus acts like an abstract computing machine, receiving instructions from programs in the form of bytecodes and interpreting these bytecodes. (Another mode of execution is "just in time" compilation in which the VM dynamically compiles bytecodes into so-called native code for faster execution.) Details on the VM for the JDK can be found in a text entitled "The Java Virtual Machine Specification," by Tim Lindholm and Frank Yellin, Addison Wesley, 1996.

The Java VM also supports multi-threaded program execution. Multi-threading is the partitioning of a computer program or application into logically independent "threads" of execution that can execute in parallel. Each thread includes a sequence of instructions to carry out a particular program task, such as a method for computing a value or for performing an input/output function. When employing a computer system with multiple processors, separate threads may execute concurrently on each processor.

Thus, object-oriented facilities like the JDK assist both development and execution of object-oriented systems. First, they enable developers to create programs in an object-oriented programming language using an API. Second, they enable developers to compile their programs, and third, they facilitate program execution by providing a virtual machine implementation.

However, object-oriented programs may not be suitable for all functions of a system or it may not be economically feasible to convert all of the programs in an existing legacy system into object-oriented programs. It may also be necessary, for a system having primarily object-oriented programs, to use features of a platform's operating system that are not available in implementations using a VM like the Java VM. Finally, the virtual machine implementation itself is generally not written in the language it executes but rather in the native code of the host machine. Thus, it is not uncommon for systems to have programs with "native" and "non-native" code.

For purposes of this description, native code includes code written in any programming language that is then compiled to run on a compatible operating system/hardware configuration. For example, native code in this context includes program code written in the C or C++ programming language and compiled by an appropriate compiler for execution on a particular platform, such as a computer having the Windows 95 operating system running on an Intel Pentium processor. Native code is distinguishable from the non-native code, which will be referred to as "target code," because while non-native code is foreign to a platform's operating system/hardware configuration, its target for purposes of this description is an abstract computing machine, such as a VM, operating on any compatible platform configuration. For example, target code for the Java VM is generally written in the Java programming language. This combination of native and target code in the same application tends to complicate the management of memory resources (i.e., the allocation and deallocation of memory) for such systems.

In practice, when an application seeks to refer to an object, the computer must first allocate or designate memory for the object. Using a "reference" to the allocated memory, the application can then properly manipulate the object. One way to implement a reference is by means of a "pointer" or "machine address," which uses multiple bits of information, however, other implementations are possible. Objects can themselves contain primitive data items, such as integers or floating point numbers, and/or references to other objects. In this manner, a chain of references can be created, each reference pointing to an object which, in turn, points to another object. When no chain of references in an application reaches a given object, the computer can deallocate or reclaim the corresponding memory for reuse.

Memory reclamation can be handled explicitly by the application program. This method, however, requires programmers to design programs to account for all allocated objects and to determine when the objects are available for reclamation. The alternative is to assign responsibility for memory management to a runtime system responsible for controlling program execution. The Java VM, one such system responsible for controlling program execution for example, includes a "garbage collector" to manage available memory resources used during execution of Java code.

"Garbage collection" is the term used to refer to a class of algorithms used to carry out memory management, specifically, automatic reclamation. Garbage collection algorithms generally determine reachability of objects from the references held in some set of roots. When an object is no longer reachable, the memory that the object occupies can be reclaimed and reused. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

To be effective, garbage collection techniques should be able to, first, identify references that are directly accessible to the executing program, and, second, given the reference to an object, identify references contained within that object, thereby allowing the garbage collector to transitively trace chains of references. Unfortunately, many of the described techniques for garbage collection have specific requirements which cause implementation problems, particularly when a garbage collector is charged with managing memory for a system having programs written in both native and target code. For example, the Java VM's garbage collector manages resources for Java code with relative ease; however, it requires additional facilities to manage resources for other native code and even then the garbage collector has significant limitations.

In most language implementations, including the implementation of the Java programming language embodied in the JDK, stacks form one component of the root set. A stack is a region of memory in which stack frames may be allocated and deallocated. In typical object-oriented systems, each method executing in a thread of control allocates a stack frame, and uses the slots of that stack to hold the values of local variables. Some of those variables may contain references to heap-allocated objects. (The heap is an area of memory designated for resources associated with objects.) Such objects must be considered reachable as long as a method is executing. The term stack is used because the stack frames obey a last-in/first-out allocation discipline within a given thread of control. There is generally a stack associated with each thread of control, and when a thread involves both native and target program code, there are often two stacks, one for each type of code. Another component of the root set includes global variables used to hold references to objects outside a stack frame, which makes the objects available to multiple methods.

A garbage collector may be exact or conservative in how it treats different sources of references, such as stacks. A conservative collector knows only that some region of memory (e.g., a slot for a local variable in the stack frame or a memory location holding a global variable) may contain references, but does not know whether or not a given value in that region is a reference. If such a collector encounters a value that is a possible reference value, it must keep the referenced object alive. Because of the uncertainty in recognizing references, the collector is constrained not to move the object, since that would require updating the reference, which might actually be an unfortunately-valued integer or floating-point number. The main advantage of conservative collection is that it allows garbage collection to be used with systems not originally designed to support collection. For example, the collectors described in Bartlett, Joel F., Mostly-Copying Collection Picks Up Generations and C++, Technical Report TN-12, DEC Western Research Laboratory, October 1989, and Boehm, Hans Juergen and Weiser, Mark, Garbage Collection in an Uncooperative Environment. *Software-Practice & Experience*, 18(9), p. 807–820, September 1988, use conservative techniques to support collection for C and C++ programs.

In contrast, a collector is exact in its treatment of a memory region if it can accurately distinguish references from non-reference values in that region. Exactness has several advantages over conservatism. A conservative collector may retain garbage referenced by a non-reference value that an exact collector would reclaim. Perhaps more importantly, an exact collector is always free to relocate objects since it is able to identify references exactly. In an exact system, one in which references and non-references can be distinguished, this enables a wide range of useful and efficient garbage-collection techniques that cannot easily be used in a conservative setting. For example, the ability to relocate objects enables an exact collector to compact used memory during a collection cycle. However, a drawback of exact systems is that they must provide the information that makes them exact, i.e., information on whether a given value in memory is a reference or a primitive value. A VM can do this effectively for its target code using techniques such as stack maps that distinguish references from primitive values in the target code's stack. However, there is no known implementation that uses exact garbage collection for programs including both native and target code and allows the same level of flexibility and convenience in writing native code.

Sun Microsystems, Inc. also developed an interface, called the Java™ Native Interface (JNI), for native program code executing within the Java VM. The JNI is comprised of a library of functions, i.e., an API, and developers of native code call upon these functions with references to them by name in the native code. The JNI functions enable the Java VM's garbage collector to obtain certain information concerning the native code for purposes of garbage collection. Using JNI functions, for example, the native code can reference objects in a heap managed by the Java VM's garbage collector. While the interface itself allows an implementation supporting exact garbage collection, in the most common implementation exact garbage collection is not possible. This is because references are maintained in the same stack used to hold references for the Java code and the Java VM uses an indicator in a special frame of Java code stack to control garbage collection of the native code objects. This implementation is satisfactory for conservative garbage collection but it does not prevent the "leaking" of direct object references outside the JNI stack frame. In other words, direct references to objects may be lost during a garbage collection cycle when all of the references may not be located in the JNI stack frame. Consequently, such an implementation of the JNI does not support an exact collection algorithm.

There is, therefore, a need for a mechanism that facilitates flexible garbage collection for memory resources for an application having two types of program code, native code familiar to an operating environment and target code for execution by an abstract computing machine associated with the operating environment.

SUMMARY OF THE INVENTION

Methods, systems, and articles of manufacture consistent with the present invention, as embodied and broadly described herein, manage memory resources corresponding to objects in a system, by providing a program component including a set of instructions native to the system. These instructions include an instruction to maintain information on use of a particular object, and permit reuse of memory resources corresponding to the particular object based on an indication from a source that the particular object is no longer being used, the source being different from any source used to provide information on use of objects associated with non-native instructions of the program component. The system includes a runtime environment for executing the program component and a garbage collector of the runtime environment is invoked to permit reuse of memory resources. The garbage collector may implement an exact garbage collection algorithm. The source may be a stack or linked list associated with the native instructions.

In another implementation, memory resources corresponding to objects in a system are managed by providing a program component including a set of instructions native to the system. These instructions include an instruction to synchronize a garbage collector with the set of native instructions, and prevent, in response to the synchronize instruction, the garbage collector from permitting reuse of memory resources corresponding to a particular object until after operation of certain native instructions. The instruction to synchronize a garbage collector with the set of native instructions may include setting an inconsistency bit in a data structure associated with the program component.

In yet another implementation, memory resources corresponding to objects in a system are managed by receiving a program component including instructions native to the system and instructions targeted to the abstract computing machine, wherein the instructions include references to objects representing memory resources, managing object references for the target instructions is a data structure, and managing object references for the native instructions in a linked list distinct from the data structure for managing object references for the target instructions. A garbage collection process is invoked to reclaim memory resources corresponding to objects based on information from both the data structure for object references for the target instructions and the linked list for object references for the native instructions. The garbage collection process reclaims the memory resources for a particular object when an indication exists that memory resources must be reclaimed to implement an instruction to allocate another object and it is determined that the target instructions and the native instructions no longer require the memory resources for the particular object.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.
Introduction Methods, systems, and articles of manufacture consistent with the present invention facilitate a flexible approach for garbage collection associated with the execution of systems having both native and target code by tracking objects referenced by each type of code in separate stacks. A stack obeys the Last-In-First-Out (LIFO) model and holds local variables, including references to objects in the heap. In contrast, "static" or global variables, which may also include references to objects in the heap, are managed outside the stack. The target code objects are identified using a map of object references in the stack for the target code, whereas objects referenced by native code are identified in the native stack using a linked list.

Figure 1:
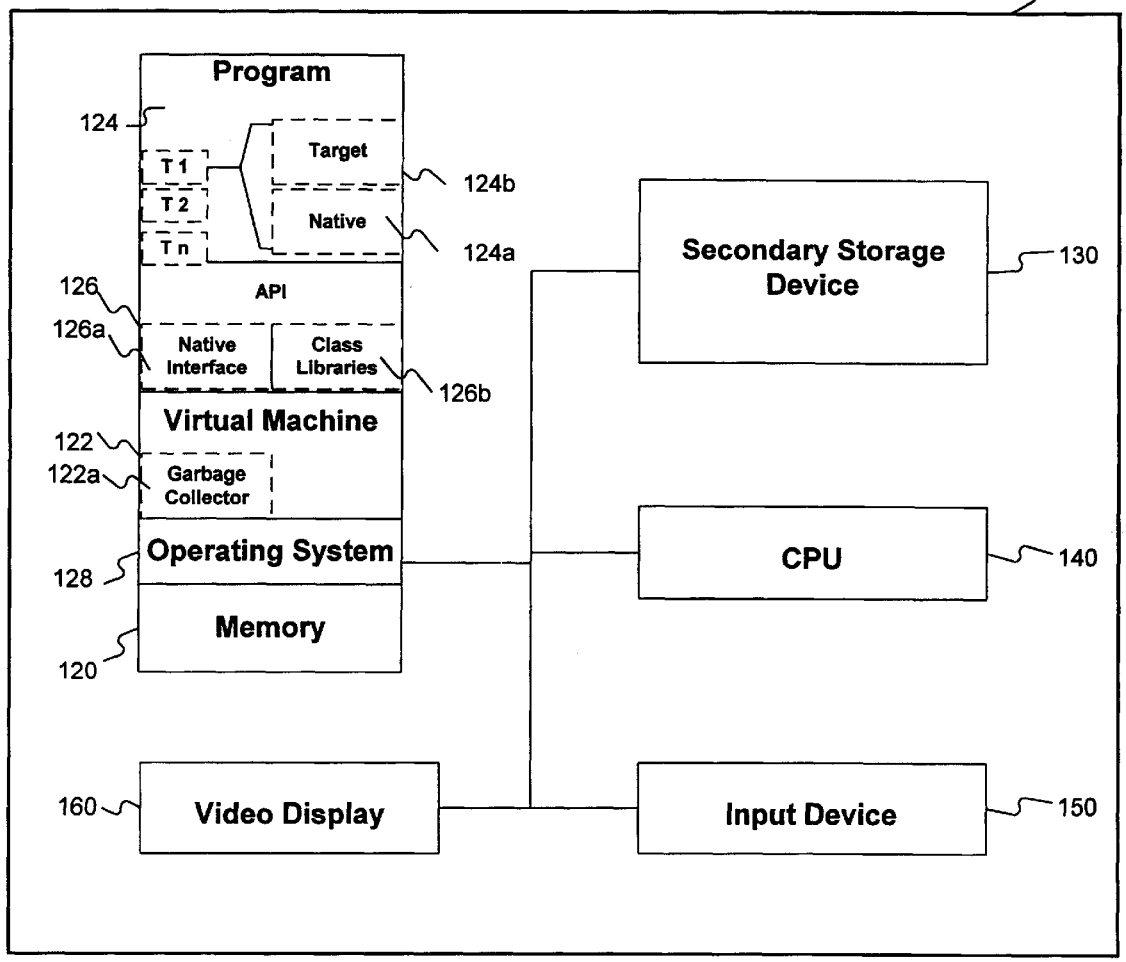
FIG. 1 is a block diagram of an exemplary system with which methods, systems, and articles of manufacture consistent with the invention may be implemented.
Figure 1:
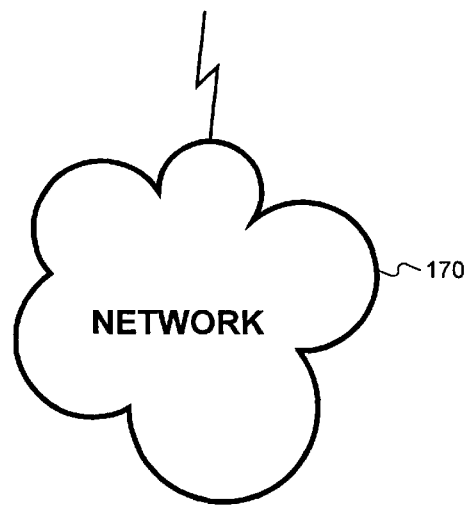

Additionally, garbage collection is not permitted during native code operations to read or write data in object fields because, during such operations, an indication exists that such collection may be inaccurate and could possibly fail to find and update object references in native code but not specified as such in the native code stack and global variables.
System Architecture FIG. 1 depicts an exemplary data processing system 100 suitable for practicing methods and implementing systems and articles of manufacture consistent with the present invention. Data processing system 100 includes a computer system 110 connected to a network 170, such as a Local Area Network, Wide Area Network, or the Internet.

Computer system 110 contains a main memory 120, a secondary storage device 130, a central processing unit (CPU) 140, an input device 150, and a video display 160, each of which are electronically coupled to the other parts. Main memory 120 contains an operating system 128, a virtual machine (VM) 122, and a multi-threaded program 124. An exemplary VM 122 for purposes of this description is the Java VM described above. In such exemplary implementations, the Java VM is part of a runtime system, which also includes an API and other facilities required for running applications using the Java VM.

One skilled in the art will appreciate that although one implementation consistent with the present invention is described as being practiced using the Java VM, systems and methods consistent with the present invention may also be practiced in different environments, including those compatible with the Java VM. Also, although aspects of one implementation are depicted as being stored in memory 120, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of data processing system 100 have been described, one skilled in the art will appreciate that a data processing system suitable for use with the exemplary embodiment may contain additional or different components.

VM 122 includes a garbage collector 122*a*. In one implementation, garbage collector 122*a* implements an exact garbage collection algorithm, although other algorithms may be implemented without departing from the principles consistent with the present invention.

For purposes of simplifying the illustration program 124 is shown with more than one thread of execution $T_1$, $T_2$ and $T_n$, although those skilled in the art will understand that each thread represents a process consisting of a set of program instructions executing in CPU 140. A single thread such as $T_1$, may execute portions of native code 124*a* and target code 124*b*. Consequently, VM 122 and garbage collector 122*a* must manage memory resources for both types of code operating in the same thread.

API 126 includes native interface 126*a* and class libraries 126*b*. Class libraries 126*b* includes a set of classes, and developers can select classes for target code 124*b*. Native interface 126*a* includes a set of functions, and developers can include in native code 124*a* calls to the native interface 126*a* to effect various functions, including memory resource management in a manner consistent with principles of the present invention.

In general, native interface 126*a* includes instructions to perform two types of functions. The first concerns managing a native stack associated with a thread of control including certain portions of native code 124*a*. These functions build and maintain a linked list structure within the native stack to identify all stack entries containing references to objects. Garbage collector 122*a* traverses the list to identify all such referenced objects and, if an object in the heap is not referenced in the native stack or elsewhere, for example, in a global variable or a stack for the target code, then garbage collector 122*a* reclaims the object's resources. The second set of functions in native interface 126*a* enable native code developers to specify periods of time during execution of native code 124*a* for which garbage collection is not permitted because, for example, execution of a garbage collection cycle may destroy objects for which references may exist outside of the known reference sources, including the native stack, global variables, and target code stack, or move such objects, updating only the known but not the unknown references. If garbage collection were permitted during such periods, there is a risk of loss of objects having valid references and, potentially, later program execution errors.

Appendix A contains a document entitled the "LLNI User's Guide," which details how to use an exemplary interface consistent with the principles of the present invention with an implementation of the Java VM having a collector that uses an exact garbage collection algorithm.

Stack Structures

Figure 2:
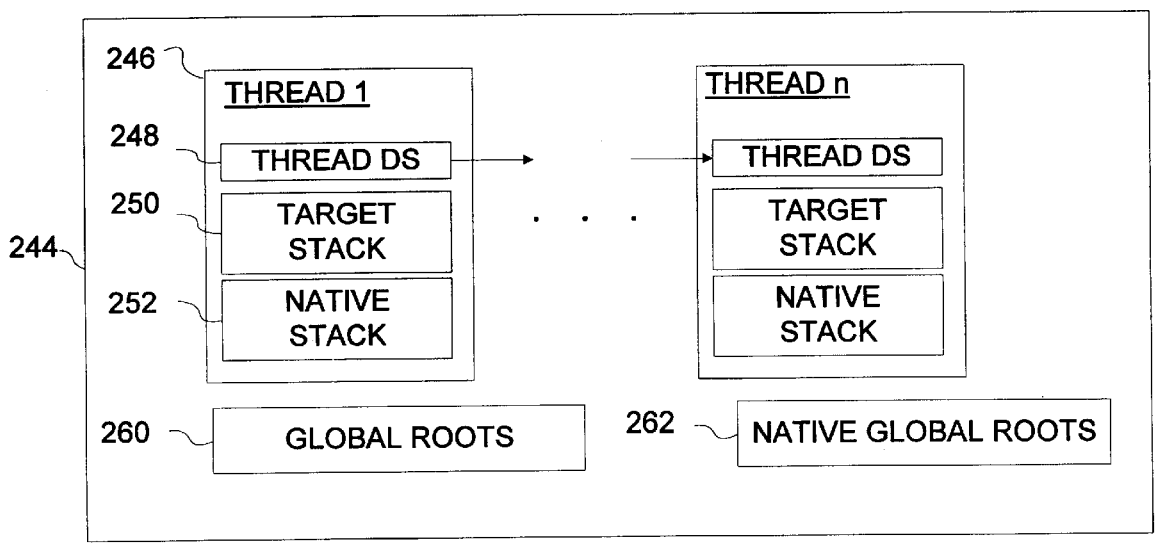
FIG. 2 is a block diagram showing data structures for a multi-threaded application consistent with the present invention.

VM 122 is responsible to executing program 124 using CPU 140 in conjunction with an operating system 128. In alternative configurations, all or some of the functions of VM 122 may be incorporated in the operating system or CPU 140. To facilitate program execution in a multi-threaded fashion, VM 122 maintains a thread element for each thread. As shown in FIG. 2, a thread element 246 includes two stacks 250 and 252 for managing execution of each type of code. For example, target stack 250 holds references to objects in memory used by target code 124*b* and native stack 252 holds references to objects in memory used by native code 124*a*. Those skilled in the art will recognize that implementations consistent with the principles of the present invention may involve intermingling the two stacks in a memory structure or use a single stack with appropriate designations to distinguish between portions of the stack used for target code versus those portions used for native code.

Thread data elements are typically linked together by thread data structures, such as thread data structure 248. For example, thread 1 data structure 248 identifies or points to a location for the data structure for a next thread. By linking all thread data elements together, VM 122 may step from thread to thread, and access the data elements of each thread.

VM 122 also maintains global roots 260 and native global roots 262 separate from the thread elements. Global roots 260 and native global roots 262 contain variables accessible by all threads. These variables may include references to stored objects.

Figure 3:
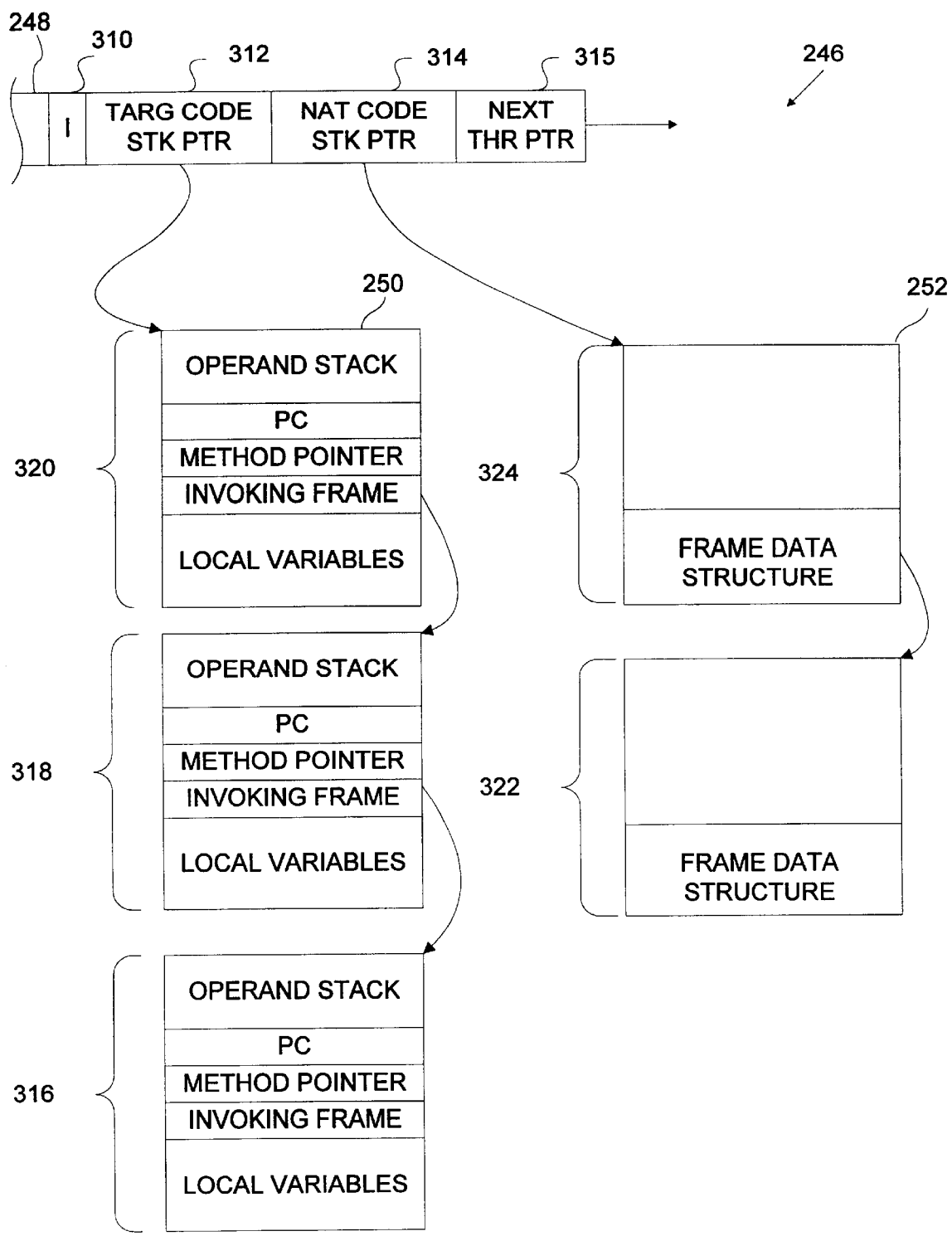
FIG. 3 is a block diagram showing a target stack and a native stack in accordance with the principles of the invention.

FIG. 3 is a block diagram showing a portion of thread data element 246 of FIG. 2 in greater detail. Thread data element 246 comprises thread data structure 248, target stack 250 and native stack 252. Thread data structure 248 includes fields of information for managing the data elements of the thread. For example, thread data structure 248 stores inconsistency bit 310, target code stack pointer 312, native code stack pointer 314, and next thread pointer 315. Thread data structure 248 may also store other information about the thread. Inconsistency bit 310 is set whenever a thread is starting to enter a region of program code that may result in pointers being used in a manner inconsistent with the implemented garbage collection algorithm.

Target code stack pointer 312 points to target stack 250. Target stack 250 stores information used during execution of target code of a particular thread. Similarly, native code stack pointer 314 points to native stack 252, which stores information used during execution of native code of a particular thread. Target stack 250 and native stack 252 have similar structures. Target stack 250 comprises frames 316, 318 and 320. Native stack 252 comprises frames 322 and 324. Finally, next thread pointer 315 points to the thread data structure of the next thread, as explained with reference to FIG. 2.

In one implementation, each stack frame 316, 318 and 320 for target code includes an area for holding local variables, an invoking frame pointer, a method pointer, a program counter (PC), and an operand stack, as shown in FIG. 3. When a target or native method starts executing, a stack frame for the method is added on the appropriate stack. The stack frame holds variables used during execution of the method, including references to stored objects.

A target method uses values in either the operand stack or the local variables of the stack frame from which it is executing. For example, a target method might add two integers by pushing the integers on the operand stack and then performing an add bytecode which pops the top two items off the operand stack, adds them, and pushes the answer back on.

Each target code stack frame 320, 318, and 320 also contains an invoking frame that points to the previous stack frame on the stack, a method pointer that points to a method block associated with the method, and a program counter (PC) that points to the current line of the method being executed.

In contrast, native code stack 252 comprises a series of linked frames 322 and 324, each of which holds local variables used by the native method executing out of the frame. As in target stack 250, native stack 252 contains local variables that reference stored objects.

As target or native methods execute, VM 122 manipulates local variables referencing stored objects, deleting references to stored objects when no longer needed by the method. Even though an object is no longer needed, it still occupies space in the heap. As more object references are deleted, the space occupied by unused objects grows until there is no space left in the heap for allocating new objects. To provide more space for object allocation, garbage collector 122a periodically determines which objects are being referenced, and reclaims the remaining space in the heap. The reclaimed space can then be used for allocating space for more objects. Garbage collector 122a determines which objects are being referenced by stepping through each thread data element 246 using the thread data structure 248 of each element.

An object is usually considered referenced if there is some path of pointers leading to the object from roots located in variables of the program. The roots of a program at a given point in execution are comprised of the global (i.e. static) variables of the program together with the local variables of any procedure or method currently being executed at that execution point. This includes, for example, global roots 260 and native global roots 262 of FIG. 2, and the local variables of stack frames 316, 318 and 320 of FIG. 3.

It is generally not difficult to identify the static variables of a program, and trace objects from those containing pointers because static variables implementing pointers generally remain pointers throughout execution. It can, however, be difficult to identify which local variables contain pointers to objects as opposed to primitive values.

To save stack space, for example, the slots in stack frames are sometimes reused. Consider a method "m" that has two subparts: a pointer-containing variable "p" that is used only during the first part, and an integer-containing variable "i" that is used only during the second part. Since "p" and "i" are never in use at the same time, a single slot "s" in a stack frame for "m" might be used for both. In such a situation, garbage collector 122a has difficulty determining whether to consider slot "s" a pointer or a primitive. If it does not consider "s" a pointer, and "s" actually does contain a pointer, the garbage collector risks incorrectly recycling the object to which "s" points.

Garbage Collection for Target Code

Figure 4:
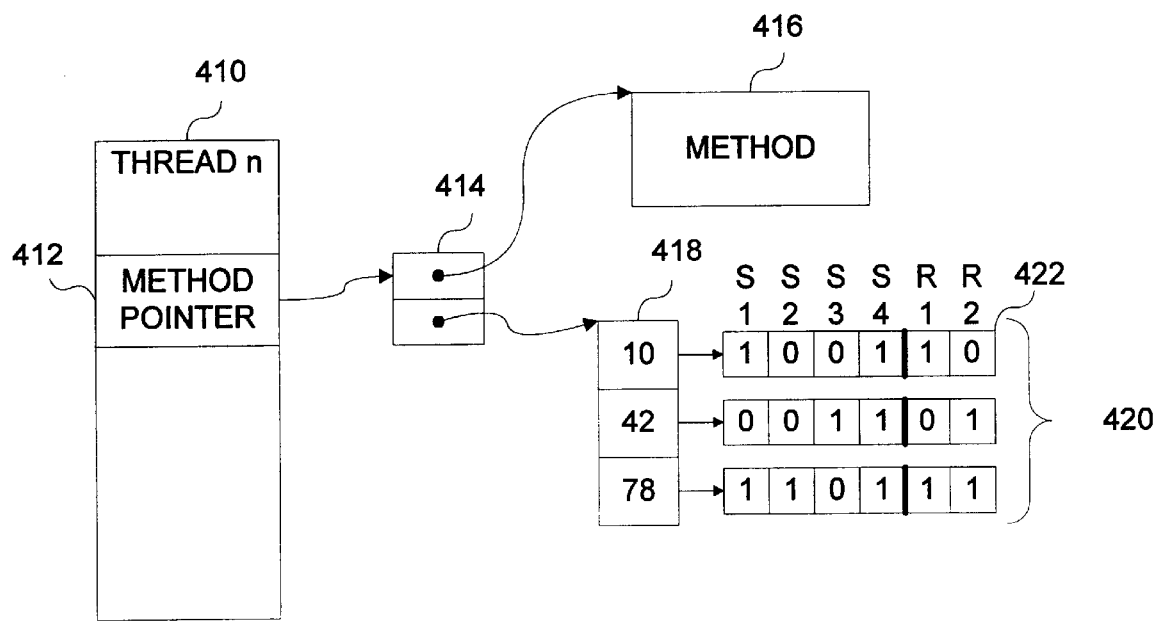
FIG. 4 is a block diagram showing a stack map for target code.

To address this problem for target code, thread element 246 has a corresponding stack map, as shown in FIG. 4. To create a stack map for a method, the method is first scanned to find safe points for garbage collection. Typically, these garbage collection safe points are times of transition, such as at a call or backward branch instruction. Once a safe point is found, the stack map defining all of the pointer locations is generated and associated with that particular instruction. Therefore, when a safe point is reached during execution, a garbage collector can determine from the stack map where each pointer is located in the stack frame at the time the respective instruction is executed. Using this information, the garbage collector knows exactly where all pointers are located. Stack maps can be generated at any point before garbage collection. For example, they can be generated when the program is compiled or during program execution.

FIG. 4 is a block diagram illustrating an example of a stack map. In the stack frame 410 associated with a method of thread n, method pointer 412 points to method block 414. Method block 414 points to the method 416, which is the code of the method. Method block 414 also points to stack map data structure 418. Stack map data structure 418 comprises program counter values corresponding to particular lines of the code in method 416. Each program counter value is associated with a respective map in the set 420. Each map in the set of stack maps 420 specifies the stack slots or memory registers containing references to heap-allocated objects. For purposes of illustration, each stack map is divided into two sections, indicated by a heavy vertical line. Locations to the left of the heavy line indicate slots (S1, S2, S3, S4) in the stack frame of the method, and locations to the right indicate registers (R1, R2).

As described above with reference to FIG. 3, a PC is stored in each frame, and is used to track the line currently being executed in the method corresponding to the stack frame. When the PC in stack 410 (not shown) equals line 10, stack map 422 defines which slots and registers have object pointers at that particular point in execution of method 416. Stack map 422 indicates that slots S1 and S4, and register R1, each marked by a "1," have a pointer when execution of method 416 is at program counter value 10. Slots S2 and S3, and register R2, each marked by an "O," do not contain pointers. Therefore, the garbage collector can determine precisely where each pointer is located for method 416 by using the set of stack maps 420.

When garbage collector 122a begins a garbage collection cycle, each thread is stopped and advanced to a safe point. Once execution reaches the safe point, garbage collector 122a uses the stack map associated with each method to determine pointer locations with certainty.

To find the stack map associated with a particular method, garbage collector 122a first steps through each thread data structure to access the target stacks, and uses the method pointer in the stack frame to access the corresponding set of stack maps. Garbage collector 122a then uses the stack map corresponding to the line of code at which the method was stopped to determine the stack frame locations having pointers referencing objects. Further details on the use of a stack map in this fashion for garbage collection can be found in O. Agesen, D. Detlefs, J. E. B. Moss, "Garbage Collection and Local Variable Type-Precision and Liveness in Java™ Virtual Machines," Proceedings of the ACM SIGPLAN '98 Conference on Programming Language Design and Implementation, ACM, 1998, pp. 269–279, which is incorporated herein by reference.

Garbage Collection for Native Code

In contrast, garbage collection for code operating out of a native stack in a manner consistent with the principles of the present invention involves including in the native code calls to certain functions of native interface 126a. Developers can modify existing native code to include the function calls; alternatively, they can write new native code with the function calls. For purposes of this description, there are two types of function calls. The first concerns creating and maintaining a linked list in the stack for the native code identifying all of the slots for local variables containing references to objects in the heap. The second involves setting inconsistency bit 310. When set, this bit prevents garbage collector 122a from executing during an "unsafe" period when not all local variables containing references to objects are identifiable.

Linked List

Figure 5:
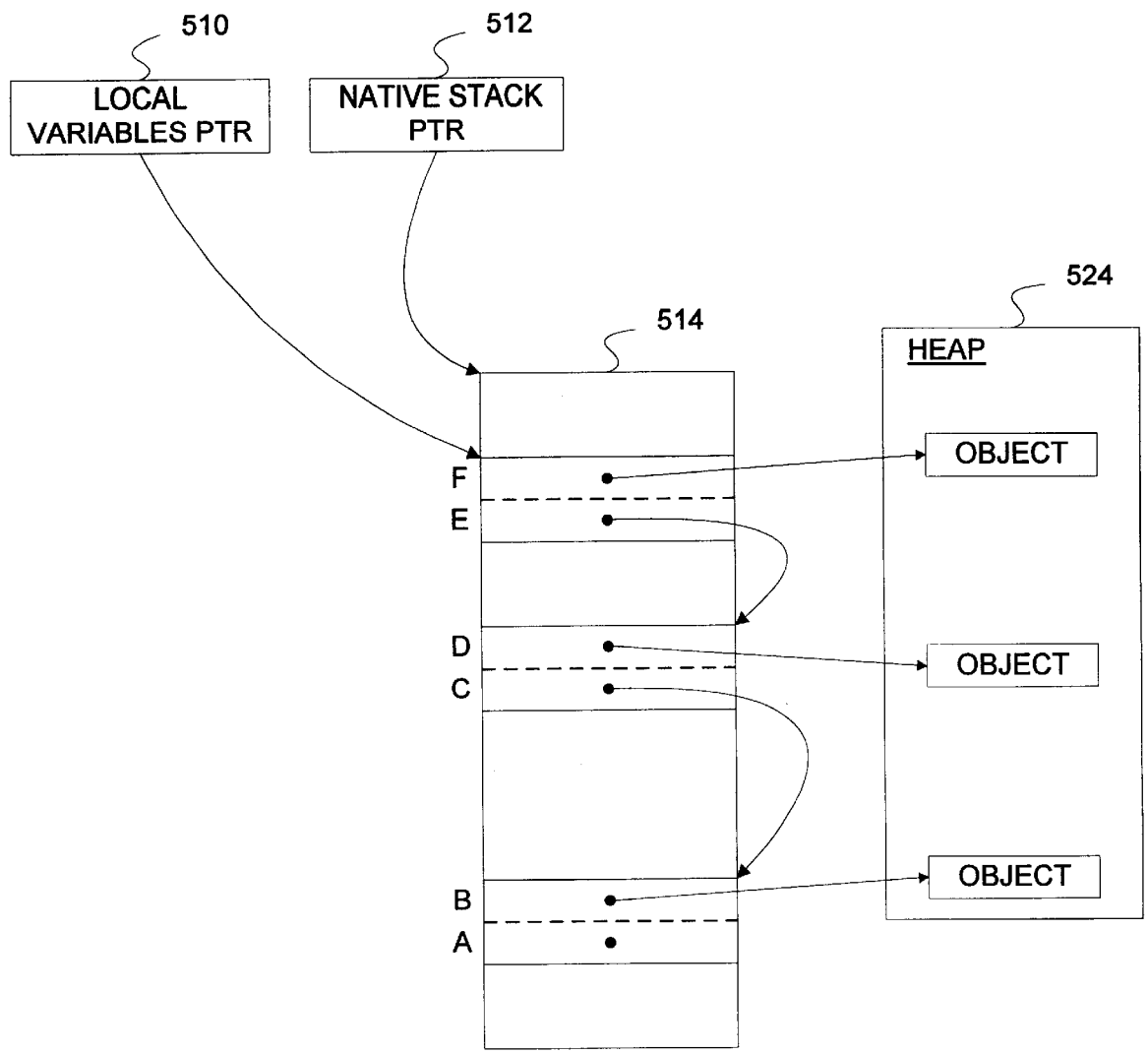
FIG. 5 is a block diagram showing a linked list of local roots created in accordance with the principles of the present invention.

FIG. 5 is a block diagram showing an implementation of a per-thread linked list of local roots created in accordance with the principles of the present invention. Stack 514 contains stack frames having slots used by native methods during execution of the methods. Slots B, D and F point to objects. Slot E points to slot D, and slot C points to slot B. Native stack pointer 512 points to stack 514, and local variables pointer (LVP) 510 points to the first local variable in the linked list.

The linked list is formed by grouping each object pointer with a pointer to the previous object pointer in the stack. Therefore, by using the value of LVP 510, garbage collector 122a can determine exactly the location of the object pointer in slot F, go to the next location and trace slot E to the object pointer in slot D, and go to the next location and trace slot C to the object pointer in slot B. Slot B is followed by A, which has a null value, indicating the end of the linked list. In this way, the garbage collector can determine the exact location of each pointer in the stack.

Figure 6:
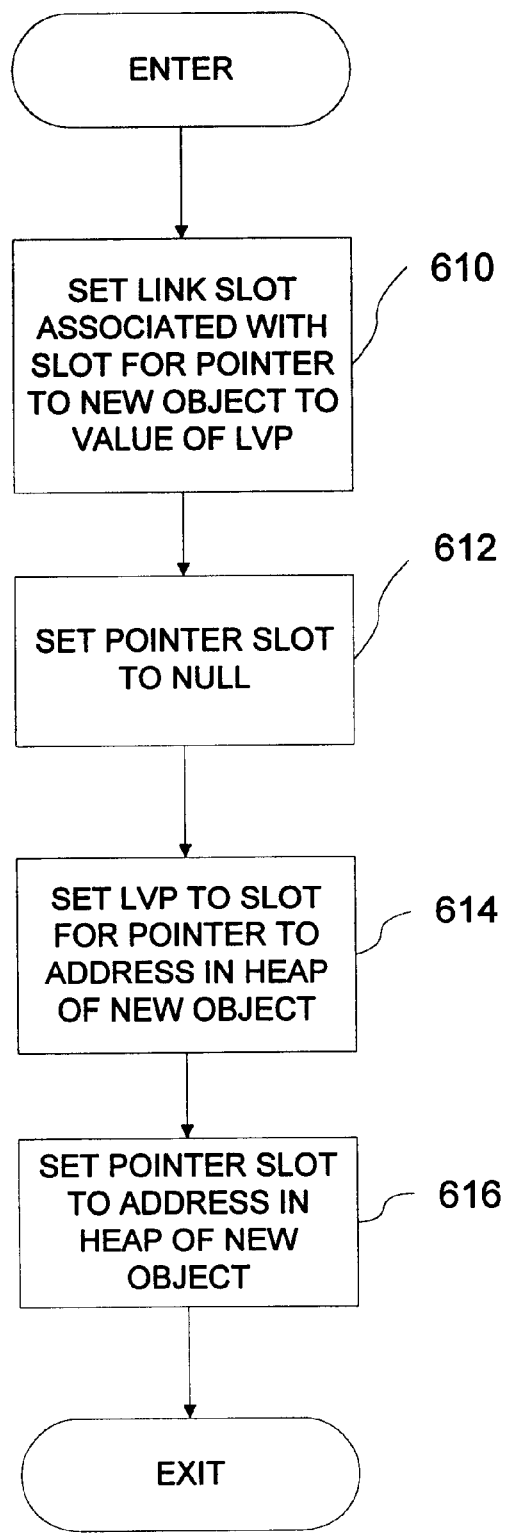
FIG. 6 is a flowchart of the procedure for creating the linked list of FIG. 5 in a manner consistent with the principles of the present invention.

FIG. 6 is a flowchart showing how the linked list of FIG. 5 is created. For purposes of this description assume LVP 510 is pointing to slot D. Upon receiving a routine call from native code 124a that requires creation of a new object pointer, VM 122 uses code in native interface 126a to set the value of slot E to the value of LVP 510 (step 610). Thus, slot E now points to slot D. VM 122 then initializes the slot for the pointer to the new object in the heap (i.e., slot F) by setting the slot to a null value (step 612). VM 122 then sets the value of LVP 510 to the address of slot F (step 614), so that LVP 510 continues to point to the uppermost object pointer in the stack. Finally, VM 122 sets the value of slot F to the address of the object in heap 524 (step 616).

When the native routine is done with a local root, VM 122 pops it off the top of the local roots linked list by setting LVP 510 to the address of the next object pointer downward in the stack. In the example shown, LVP 510 will be set to the value stored in slot E, i.e., the address of slot D.

Any global variables containing object references are also manipulated using a similar linked list structure.

GC Synchronization

Objects in the heap can be accessed by means of direct and indirect pointers. A direct pointer is the same as a reference in a local or global variable and can be used in a program to access an object. In contrast, an indirect pointer is a pointer to a direct pointer. Consistent regions of program code use only indirect pointers to reference objects. To access an object, for example, to write a value in a field of the object, the indirect pointer is "dereferenced," obtaining access to the direct pointer and thus access to the object itself. Regions of program code during which objects are accessed by using direct pointers are "inconsistent" regions because the dereferencing of an indirect pointer may copy a direct pointer value into a location not known by the garbage collector to contain such a pointer. Thus, garbage collection is not permitted during inconsistent regions of program code because it is not possible to determine exactly which slots in the stack frame are pointers to objects in the heap. If the garbage collector relocates an object (as is often the case with a compacting garbage collector, for example), the collector may fail to update direct pointers that were obtained by dereferencing indirect pointers to the new location of the relocated objects. Thus, to access an object for read or write purposes in a manner consistent with the present invention, garbage collection must be postponed until the access operation is completed. This is accomplished by including in the native code a call to a GC synch routine of interface 126a to set inconsistent bit 310 in thread data structure 248, indicating that the thread is now in an inconsistent region and garbage collection is not permitted. For efficiency, the call may be "in-line," meaning the program code for the called routine is actually included in the calling program instead of requiring the routine to be loaded from another location. The GC synch routine synchronizes native code with garbage collector 122a.

Figure 7:
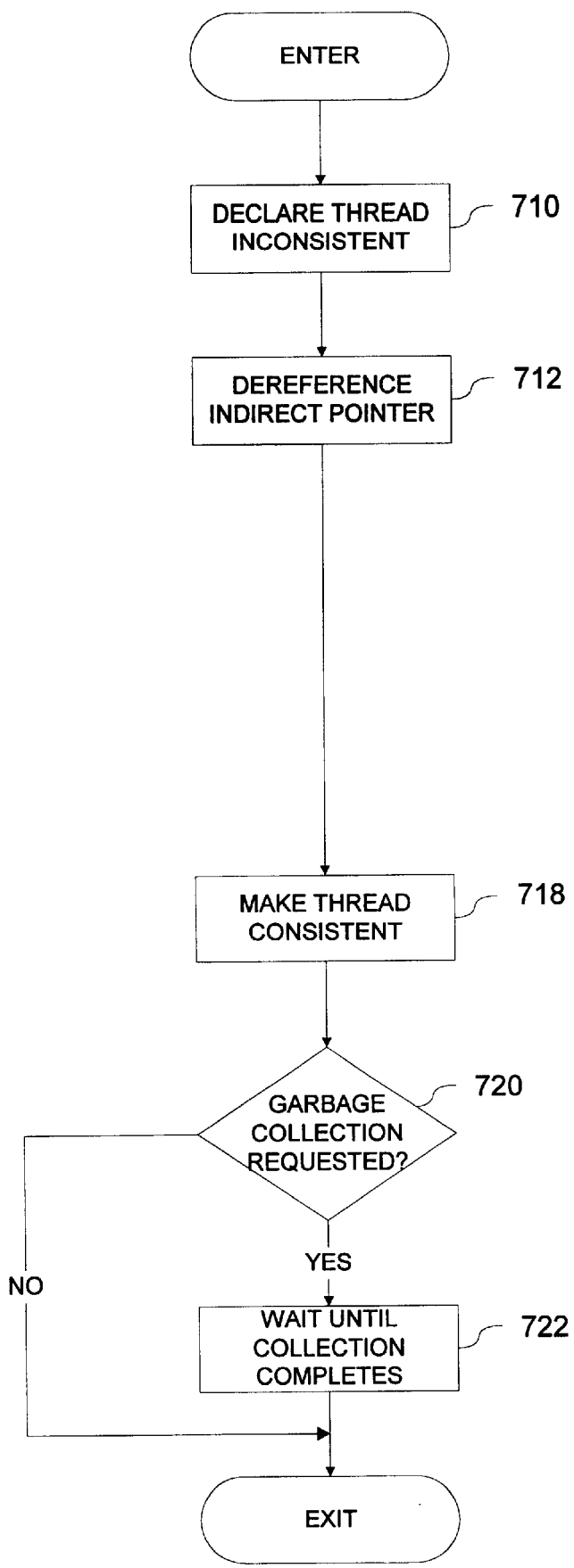
FIG. 7 is a flowchart illustrating a first method for synchronizing inconsistent threads with garbage collection in a manner consistent with the principles of the present invention.

FIG. 7 is a flowchart illustrating a method for synchronizing inconsistent threads with garbage collection consistent with the principles of the present invention. When an inconsistent region of code is entered, the native code declares the thread inconsistent by calling a routine of interface 126a to set the inconsistent bit 310 (step 710).

VM 122 then dereferences the indirect pointer received in the routine call using interface 126a (step 712) to obtain the value pointed to by the indirect pointer (i.e., the direct pointer). After native code is through using the direct pointer associated with an indirect pointer, the thread consistency bit is reset (step 718). A global flag is then checked, to determine whether a garbage collection was requested while in the inconsistent region (step 720). If the global flag indicates that no garbage collection was requested, the process is exited. If the global flag indicates that garbage collection has been requested, VM 122 waits until collection is complete (step 722).

Figure 8:
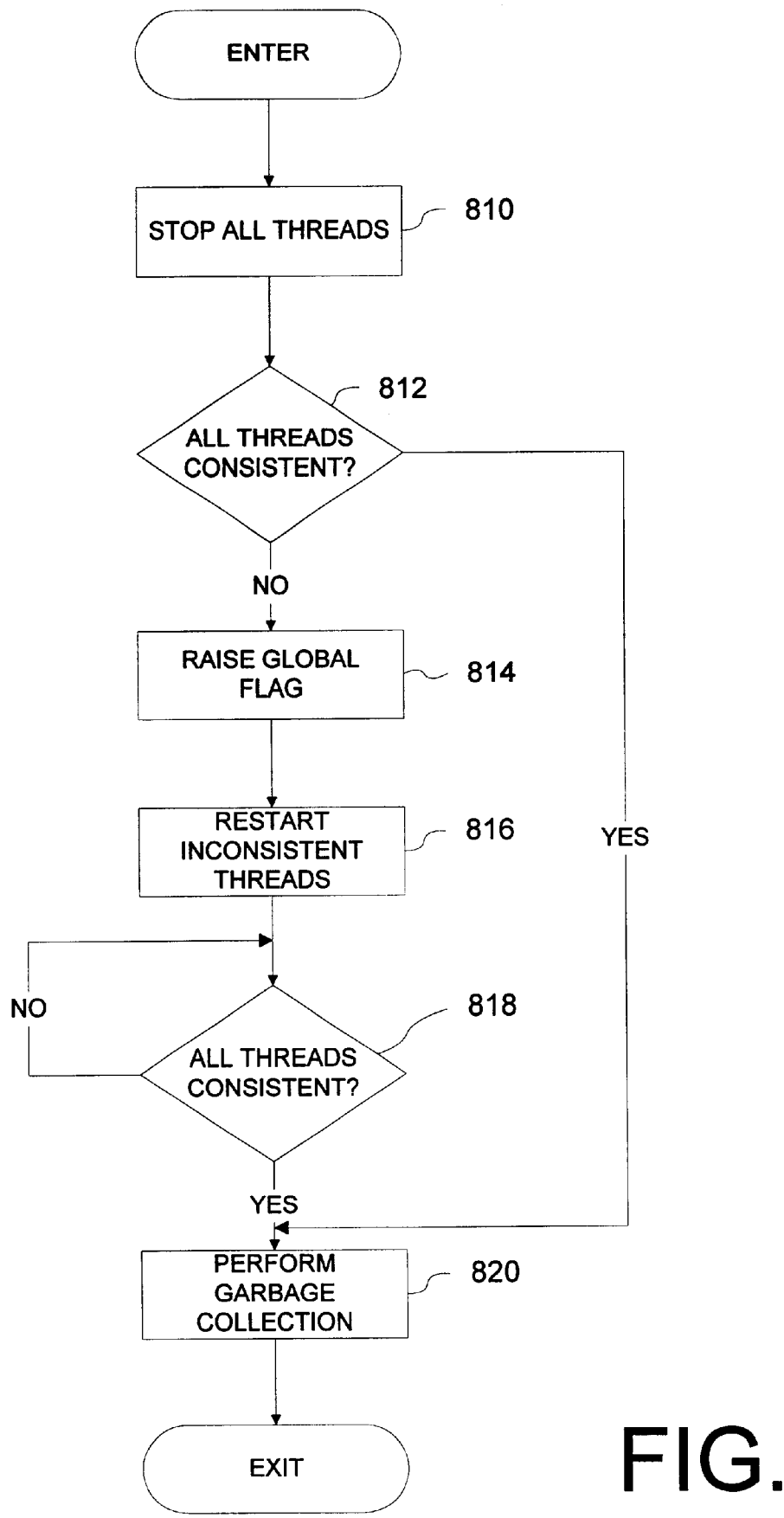
FIG. 8 is a flowchart showing the processing performed by a garbage collector in a manner consistent with the principles of the present invention.

FIG. 8 is a flowchart showing the processing performed by garbage collector 122. For example, when a method requests to allocate an object and the request cannot be granted because the heap is full, the thread must run a garbage collection to find memory space to satisfy the allocation request. In response to a garbage collection request, garbage collector 122 first stops all threads currently being executed (step 810). Garbage collector 122a then determines whether all threads are consistent by checking the inconsistent bit 310 of each thread data structure 248 (step 812). If all threads are consistent, garbage collection is performed (step 820), after which the threads are restarted.

If some threads are not consistent, garbage collector 122 raises a global flag (step 814) indicating to threads coming out of inconsistent regions that the thread should synchronize with garbage collector 122 when it comes out of an inconsistent state. Garbage collector 122 then restarts the inconsistent threads (step 816) and waits until all threads are consistent (step 818). Upon all threads becoming consistent, garbage collection is performed (step 820) and the threads are restarted.

Therefore, threads may temporarily enter an inconsistent region, which prevents garbage collector 122 from starting a collection cycle.

CONCLUSION

Methods, systems, and articles of manufacture consistent with the present invention therefore facilitate a flexible approach for garbage collection associated with the execution of systems having both native and target code and permit implementations using either a conservative or exact collection algorithm.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

APPENDIX A

LLNI User's Guide

This document describes how to use the Low Level Native Interface (LLNI) to implement native methods in a Java™ Virtual Machine.

Contents
1. Overview
2. Reference
3. Examples

Overview Section

Background

A Java™ Virtual Machine executes abstract instructions ("Java bytecodes") in one or more threads of control ("Java threads"). A JVM may execute the bytecodes by interpreting them directly, or by first compiling the bytecodes into a native form and executing the native code ("JITted code"). Both forms of the code executed are known as "Java code". Each Java thread has a private stack ("Java stack"). The JVM contains explicit support for objects ("Java objects"), which are dynamically allocated out of a garbage collected heap ("Java heap"). Java objects are described by classes ("Java classes"). The JVM supports instances of a class (java.lang.String) that represents sequences of Unicode characters ("Java string"). The JVM supports exceptions ("Java exceptions") that result in immediate dynamic transfer of control from a "throwing" bytecode to a "catch" bytecode. In addition to supporting data in Java objects, a JVM supports manipulating variables associated with Java classes ("Java static variables").

The current Java™ Development Kit is implemented using the original native interface. The original interface requires using a conservative, handle-based garbage collection (GC) algorithm. There are a variety of other GC algorithms available that can provide faster collection, and/or lower pause times, and/or better execution speed, and/or better low memory performance in different circumstances.

In order to allow a Java Virtual Machine to use different GC algorithms, all of the C code in the JVM needs to be careful when it has a reference to a Java object. An interface between C code and the GC must accomplish three things:

1. The C code must let the GC know where all references to Java objects are kept. This will make sure that every Java object referenced from C code will stay alive across a GC, and the GC can update the C code's pointers to the object if it is moved.
2. For some GC algorithms, the C code needs to let the GC know when it reads or writes to a Java object.
3. The GC must not modify data while the interface is reading or writing the data. GCs often modify data when they move objects and update references to the moved objects.

"User level" native methods can use the Java Native Interface (JNI) to automatically get safe references to Java objects. There are some tasks that are impossible to do efficiently or at all with the JNI. The Low Level Native Interface (LLNI) is designed to be used by the implementors of a Java Virtual Machine. The LLNI is not expected to become a standard API in all JVMs. The LLNI satisfies the requirements of a native interface in four ways:

1. The LLNI provides routines to manually register locations that point to Java objects, so the GC can track which objects are alive and can update references to moved objects.
2. The LLNI provides accessors that communicate important changes in the heap to the GC (using read or write barriers if needed).
3. The LLNI accessors also read from and write to Java objects in a way that prevent interference from the GC.
4. The LLNI also provides a way to temporarily disable GC using *inconsistent regions*. While in an inconsistent region, code does not have to register locations or worry about interference from the GC, but still needs to go through read or write barriers. Inconsistent regions can be used to perform tasks not implemented by the LLNI.

Differences between JNI and LLNI

The JNI is a standard API designed to be safe, easy to use, and allow object layouts to change without recompiling the native methods. JNI is not always the most efficient way to access Java objects however. For example, the JNI (potentially) creates a "handle" for every object that the C code uses, and registers the handle in a per-thread table. The LLNI allows C code to manually register locations that refer to Java objects. A function that needs to look at every object in an array might register thousands of handles if it used the JNI, but only one if it used the LLNI. The LLNI also lets C code temporarily "disable" GC so it doesn't have to do any registration. In addition the JNI doesn't give JVM developers access to system data like class blocks, field blocks, etc. On the other hand, LLNI code will need to be recompiled if the layout of an object changes.

Differences between RNI and LLNI

Microsoft has implemented a Raw Native Interface (RNI) in their Java Virtual Machine. The basic mechanism in the RNI for co-ordinating with the GC is to disable it for extended periods. This eliminates the need to register object references, and makes dereferencing safe from interference from the GC. By default, all calls to RNI native methods will disable GC. But in a low-memory situation, disabling GC will block all other threads that need to allocate memory, and furthermore prevent any real-time GC algorithms. The RNI does allow a thread to globally enable or disable GC, but not at a per-thread level like the LLNI. This means that RNI can not guarantee that there will be a window in time that GC is enabled, because alternating threads could be enabling/disabling GC.

The RNI also does not enforce the use of write barriers or enable read barriers at all. Read and write barriers are used by some GC algorithms to support efficient generational and real-time collectors.

Like the LLNI, the RNI allows the programmer to manually register locations that point to Java objects, but in a way that is more awkward to use. In particular there is no way to safely pass an RNI reference as a parameter without disabling GC or passing references to references.

Design of the LLNI

Handles

The LLNI allows C code to refer to Java objects through LLNI "handles". An LLNI handle is an indirect pointer through a registered location to a Java object. This does not require that Java objects refer to each other via handles however. Java static variables and Java objects use direct pointers to Java objects. Notice that unlike a "JHANDLE*" in the original native interface, an LLNI handle can refer to different objects over time, and that multiple handles may point to the same Java object.

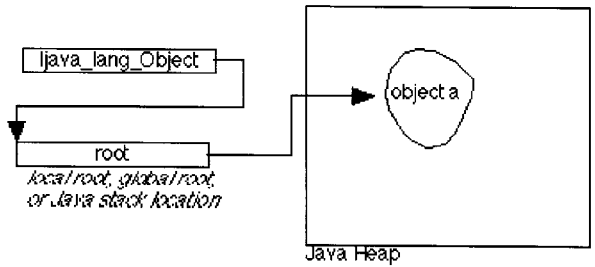

Figure 1: LLNI handle to a Java object

There are three main sources of registered locations for LLNI handles:

- The Java stack is implicitly registered with the GC, so the address of a an item in the Java stack is a legal LLNI handle.
- *local roots* can be registered with the GC. A local root is a location that can be efficiently registered and unregistered in LIFO order.
- Global variables or heap areas can be registered with the GC as *global roots*.

Since C code can only reference Java objects indirectly via handles, which are pointers to registered locations, the GC knows which objects to keep alive. The GC can also update the registered locations if an object is moved, thus keeping the handles valid. C code can freely pass handles to other functions without further registration. C functions can "return" new handle values efficiently with only slight inconvenience using a convention described later.

Manipulating Handles

Since GC and object movement can happen at any time, handles should only be dereferenced in a guarded manner. For example, this attempt to make "handle1" refer to the same object as "handle2" would be incorrect:

```
*handle1 = *handle2;
```

If a GC happens between evaluating "*handle2" and performing the assignment, "handle1" will be set to point indirectly to the location where the object *used* to be if it has moved. To avoid such problems, the LLNI provides a rich set of routines for safely manipulating objects through handles. For example, the routine

```
LLNI_copy(ee, handle1, handle2)
``` makes "handle1" refer (indirectly) to the same object as "handle2".

In addition to guarding against object movement, all reads and writes to an object need to go through read or write barriers if the GC algorithm requires them. Read or write barriers can be inserted into the entire JVM by simply changing the definitions of a few macros. Finally, the LLNI macros provide a wide variety of error checking in the debug version of the JVM. These macros should be used to the greatest possible degree.

Accessing Object Fields direct pointer to the object. The direct pointer type is volatile because the GC may change its value behind the C code's back. This struct name is verbose to make it obvious where code is using direct pointers. Direct pointers are occasionally required but must be used with care.
- A typedef for a pointer to the direct pointer named I*package_Class*. This is the type of a handle to the object.

For example, javah creates approximately the following for java.lang.String:

```
struct java_lang_String {
    ObjHeader h;
    DEREFERENCED_IArrayOfChar DONT_TOUCH_value;
    java_int DONT_TOUCH_offset;
    java_int DONT_TOUCH_count;
};
typedef java_lang_String *volatile DEREFERENCED_Ijava_lang_String;
typedef DEREFERENCED_Ijava_lang_String *Ijava_lang_String;
```

The LLNI provides operations to get and set 32-bit value fields, reference fields, long fields, and double fields (this covers all possibilities). For example, to get the "value" field of a String, you can do:

```
LLNI_getRefField(ee, str, value, array);
```

This will make the (previously registered) handle "array" refer to the character array stored in the "value" field of "str". This is equivalent to :

```
... begin an inconsistent region (described later)...
*array = (*str)->value;     // actual code goes through a read barrier
... end the inconsistent region ...
```

The variable "str" must be a handle to a struct with a field named "value" (such as Ijava_lang_String), and the variable "array" must have the type that matches the type of the field (such as IArrayOfChar). Otherwise a compile-time type error will occur.

Local Roots

The most common way to get a new registered location is to create a local root. A local root is a location that can be efficiently registered and unregistered in a stack fashion (last in, first out).

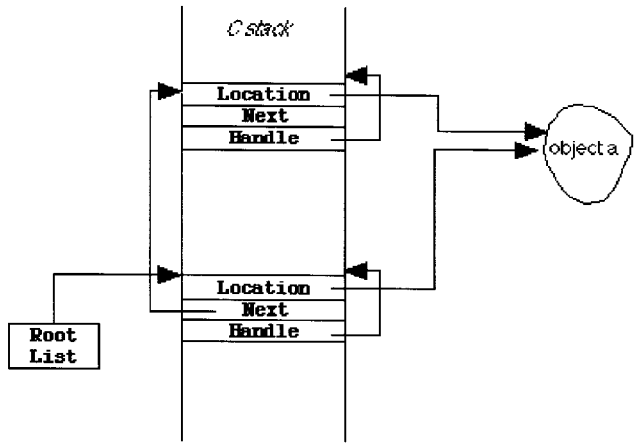

Figure 2: Local Roots on the stack

The LLNI provides macros that allocate a local root, register the local root with the GC, declare a local handle variable, and set the handle to point to the local root. The LLNI also has macros that will un-register the local roots. For example:

```
void foo(Ijava_lang_String str) {
    beginLocalRoots1(ee, IArrayOfChar, chars);    // Decl. and register root.
                                                  // "*chars" will be NULL here.
        LLNI_getRefField(ee, str, value, chars);  // Fetch string's
                                                  // "value" into "chars".
        .... use chars ....;
    endLocalRoots;
                                                  // Now "chars" is no longer a GC root.
}
```

Global Roots

Global roots are locations that are registered with the GC. Unlike local roots, global roots can be registered and unregistered in any order. The cost for this added flexibility is slower registration/unregistration. Global roots are commonly used to register long-lived, system data structures, such as constant pool items and JNI tables. For example, the following code registers a handle to a pre-computed exception object:

```
// declare root and handle.  Root is not registered yet!
DeclareStaticGlobalRoot(Ijava_lang_Object, outOfMemory);

void exceptionInit(void) {
    Ijava_lang_Class cls;
    registerGlobalRoot(outOfMemory);           // register root
    FindClass(ee, JAVAPKG "OutOfMemoryError", TRUE, cls);
    LLNI_newInstance(ee, cls, outOfMemory);    // set handle to refer to new object
}
```

Returning New Handles

Although handles to new registered locations can be returned as results, this style has the difficulty of having the caller be responsible for disposing something produced by the callee (the registered location must be unregistered by the caller). To avoid this inconvenience, instead of returning a handle from the callee to the caller, the caller passes the callee a handle, which gets set to the result. Then the caller is both creating and destroying the handle (the caller can often use an efficient local root). For example, the routine

```
LLNI_getRefField(ee, handle, fieldName, resultHandle)
``` stores in the "resultHandle" the contents of the field "fieldName" of the object denoted by "handle". We recommend using this convention when writing C code that needs to "return" Java objects.

Classes

Classes need to be referenced through Ijava_lang_Class handles in order to support class unloading. This allows the GC to determine which classes are in use, and potentially move classes. Some Java virtual machines may allocate the java.lang.Class object separately from the internal class data structure, or may implement them as one data structure but allocated in a different pool from other objects. In order to allow this flexibility, the LLNI provides wrappers to all major fields of a class structure. In addition, classes are always synchronized via the java.lang.Class object.

Inconsistent Regions

The operations for manipulating handled objects have been designed to cover most uses. Even so, a few cases may need more open-ended access to the handled object. The LLNI defines operations LLNI_beginInconsistent, LLNI_endInconsistent, and LLNI_inconsistentDo that create *inconsistent regions* of code. When a thread is in an inconsistent region, the GC knows it may not have a complete set of roots (so it can't complete a GC), and that it can't move objects in memory. This allows C code to directly dereference handles, and use unregistered locations. Accessing fields and array elements should still go through the routines defined in the Direct Layer, which support read and/or write barriers. See "memsys.h" for more information on the Direct Layer.

> Warning: The code in an inconsistent region must follow these rules:
> - Must always execute in bounded (and very short) time.
> - Cannot cause any allocation.
> - Cannot acquire any locks, perform I/O, or other actions that may block the thread indefinitely or require it to synchronize with other threads.
> - Cannot jump out of the inconsistent region by a return, goto, continue, break, or longjmp. The code that ends an inconsistent region must execute.

When a thread enters an inconsistent region, other threads may still allocate memory. An inconsistent region will block other threads only when a GC is required.

Implementing Native Methods

Native methods that will be called directly by Java code must use the Java Native Interface (JNI). Native methods that should run on any JVM should only use JNI functions, and functionality from external libraries. Native methods that will only be shared among the JDK, HotSpot™ VM, and exact VMs can also use the private JVM interface. And native methods specific to the exact VM can use LLNI operations if needed.

To implement a native method, define a C function using the JNI conventions. The first argument to the native method will be a "JNI execution environment". The native method will be passed registered handles to any Java objects instead of direct object pointers. Primitive value types are passed in unchanged.

For example, the declaration of the hashCode method for java.lang.Object looks like:

```
JNIEXPORT jint JNICALL
Java_java_lang_Object_hashCode(JNIEnv *env, jobject this)
{
    return JVM_IHashCode(env, this);
}
```

Note that the JVM will not allow method calls on null objects, so the "this" handle is never null.

Summary

The LLNI provides an efficient but safe interface between the core JVM and the GC module:

- handles can be passed from C function to C function with no overhead.
- handles can be returned from C functions and, more commonly, they can be used to return values "by reference".
- handles provide efficient access to the handled object (one indirection).
- handles can be based on Java stack locations, local GC roots, or global GC roots, providing many choices of efficiency of creation and lifetimes.
- LLNI provides a comprehensive set of basic operations for safely manipulating handled objects.
- Advanced users may temporarily enter an inconsistent region, which will disable GC. While in the inconsistent region the unsafe LLNI operations as well as the operations in the Direct Layer can be used.

Reference Section

Many of the operations in the LLNI are implemented as macros. This is efficient and provides the ability to accept multiple types safely. This document uses the following notation to describe such operations:

- Operations that work with any handle are described with the type *any-handle*.
- Operations that work with any direct object pointer are described with the type *any-ref*.

Notice that many operations that might be expected to be expressions are instead statements that take a final result argument. For example:

void LLNI_getIntArrayElement(*any-handle* handle, java_int i, java_int res)
Sets "res" to the i-th element of array object referenced indirectly by "handle".

"res" must be an *L-value*, such as a caller's local variable. The LLNI has to use this convention in order to implement the operations as macros (there are too many limitations on expressions in C to make these expressions macros). Some of the operations *must* be macros in order to get proper compile-time type checking (LLNI_getIntField for instance). This convention also matches the convention used for functions that wish to return new handle values.

Most of the LLNI "setter", local root, allocation, and inconsistent region operations take an "ExecEnv*" argument, which contains per-thread information. You can call the EE() function to get an execution environment.

None of the LLNI operations signal Java exceptions such as "NullPointerException". The debug version of LLNI will test many assertions however and "panic" if one fails. All operations are defined in "llni.h" unless noted otherwise.

Handle Operations

*any-handle* LLNI_getHandle(*any-ref* r)
Returns a handle from a direct reference "r". "r" must be an *L-value* that refers to a Java stack location or other registered GC root. Note that handles are usually created by local or global roots.

void LLNI_copy(ExecEnv* ee, *any-handle* dstH, *any-handle* srcH)
Make the handle "dstH" (indirectly) point to the same object as the handle "srcH".

void LLNI_setToNull(*any-handle* handle)
Make the "handle" point to no object (NULL).

bool_t LLNI_isSameObject(Ijava_lang_Object h1, Ijava_lang_Object h2)
Return TRUE if "h1" and "h2" (indirectly) points to the same object, and FALSE otherwise.

bool_t LLNI_isNull(*any-handle* handle)
Returns TRUE if "handle" is NULL. Note that a handle is NULL only if the registered location it points to contains NULL - it's not the same as testing "handle == NULL".

Debugging Operations bool_t LLNI_isValidHandle(Ijava_lang_Object handle)
Attempt to sanity-check that "handle" is valid. Returns TRUE if "handle" refers to something that looks like a valid object, or LLNI_isNull(handle) is TRUE. Returns FALSE if "handle" definitely doesn't refer to a valid object..

bool_t LLNI_isNonNullValidHandle(Ijava_lang_Object handle)
Returns TRUE if LLNI_isNull(handle) is FALSE and LLNI_isValidHandle(handle) is TRUE.

bool_t LLNI_isValidClass(Ijava_lang_Class cls)
Attempt to sanity-check that "cls" is valid. Returns TRUE if "cls" refers to something that looks like a valid class. Returns FALSE if "cls" is NULL or definitely doesn't refer to a valid class.

void* LLNI_objectAddressAsPtr(*any-handle* handle)
Use only for debugging and printing diagnostics messages.

Object Operations

Class* LLNI_getClass(Ijava_lang_Object handle)
Returns the class of object referenced indirectly by "handle".

void LLNI_getHashCode(ExecEnv* ee, *any-handle* handle, java_int res)
Gets the value of the hashcode field of an object. "res" must be an *L-value*. Most code should call java_lang_Object_hashCode which initializes the hash code if necessary instead of this.

void LLNI_setHashCode(ExecEnv* ee, *any-handle* handle, java_int number)
Sets the value of the hashcode field of an object. Should not be called except by java_lang_Object_hashCode.

Object Field Operations

The following macros get or set a named field of an object referred to by a handle. These LLNI macros also provide safe access, support read and write barriers, and provide error checking.

The set macros take a new value argument and set the field to the value. For example:

```
LLNI_setIntField(ee, str, offset, 100);
``` is equivalent to:

```
... begin an inconsistent region ...
(*str)->offset = 100;    // actual code goes through a write barrier
... end the inconsistent region ...
```

The example is legal only if the type of "str" is a handle to a struct with a field named "offset" (such as Ijava_lang_String). Otherwise a compile-time error will occur.

The get macros take an *L-value* result argument which is set to the value of the field. For example:

```
LLNI_getIntField(str, offset, startIdx);
``` is equivalent to:

```
... begin an inconsistent region ...
startIdx = (*str)->offset; // actual code goes through a read barrier
... end the inconsistent region ...
```

The result argument must have a type that is assignable from the type of the field.

```
void LLNI_getIntField(any-handle handle, fieldName, java_int res)
void LLNI_getFloatField(any-handle handle, fieldName, java_float res)
void LLNI_getPtrField(any-handle handle, fieldName, void* res)
void LLNI_getLongField(any-handle handle, fieldName, java_long res)
void LLNI_getDoubleField(any-handle handle, fieldName, java_double res)
```
Store the contents of specified field into res. "res" must be an *L-value*, and must have a type that is assignable from the type of the field.

```
void LLNI_getRefField(ExecEnv* ee, any-handle handle, fieldName, any-handle targetHandle)
```
Put contents of specified reference field into location pointed to by "targetHandle" (which must be registered as holding a java reference). "targetHandle" must be an *L-value* that is assignment compatible with the type of the field.

```
void LLNI_setIntField(ExecEnv* ee, any-handle handle, fieldName, java_int val)
void LLNI_setFloatField(ExecEnv* ee, any-handle handle, fieldName, java_float val)
void LLNI_setPtrField(ExecEnv* ee, any-handle handle, fieldName, void* val)
void LLNI_setLongField(ExecEnv* ee, any-handle handle, fieldName, java_long val)
void LLNI_setDoubleField(ExecEnv* ee, any-handle handle, fieldName, java_double val)
```
Set specified field to "val".

```
void LLNI_setRefField(ExecEnv* ee, any-handle handle, fieldName, any-handle srcObjHandle)
```
Set specified reference field to the the java object indirectly referenced by the handle "srcObjHandle".

Static Field Operations

Currently there are no static field accessors in the LLNI, but they can be added in the future. There wasn't a good interface to static fields in the original interface, so there is no code in the JDK the requires this feature.

Array Operations

The following array operations do not signal "ArrayOutOfBoundsException"s. The debug version of LLNI will "panic" when given illegal indexes however. It is illegal to use a "Val" operation on an array of references or a "Ref" operation on an array of values.

bool_t LLNI_isArray(Ijava_lang_Object handle)
Return TRUE iff "handle" is an array of some kind.

bool_t LLNI_isValArray(Ijava_lang_Object)
Return TRUE iff "handle" is an array of primitive values.

bool_t LLNI_isRefArray(Ijava_lang_Object handle)
Return TRUE iff "handle" is an array of object references.

java_int LLNI_getArrayLength(IArrayOfAny handle)
Return the length of array object referenced indirectly by "handle".

java_int LLNI_getArrayElementSize(IArrayOfAny array)
Return the size (in bytes) of each element in the array referenced by "handle".

void LLNI_getIntArrayElement(*any-handle* handle, java_int i, java_int res)
void LLNI_getCharArrayElement(*any-handle* handle, java_int i, java_char res)
void LLNI_getShortArrayElement(*any-handle* handle, java_int i, java_short res)
void LLNI_getBooleanArrayElement(*any-handle* handle, java_int i, java_boolean res)
void LLNI_getFloatArrayElement(*any-handle* handle, java_int i, java_float res)
void LLNI_getPtrArrayElement(*any-handle* handle, java_int i, void* res)
void LLNI_getLongArrayElement(*any-handle* handle, java_int i, java_long res)
void LLNI_getDoubleArrayElement(*any-handle* handle, java_int i, java_double res)
Sets "res" to the value of the "i"'th element in array object referenced indirectly by "handle". "res" must be an *L-value*.

void LLNI_getRefArrayElement(ExecEnv* ee, *any-handle* handle, java_int i, *any-handle* targetHandle)
Sets "*targetHandle" to the value of the "i"'th element in array object referenced indirectly by "handle". "targetHandle" must be an *L-value*.

void LLNI_setRefArrayElement(ExecEnv* ee, *any-handle* handle, java_int i, *any-handle* e)

void LLNI_setIntArrayElement(ExecEnv* ee, *any-handle* handle, java_int i, java_int e)
void LLNI_setCharArrayElement(ExecEnv* ee, *any-handle* handle, java_int i, java_char e)

void LLNI_setShortArrayElement(ExecEnv* ee, *any-handle* handle, java_int i, java_short e)
void LLNI_setBooleanArrayElement(ExecEnv* ee, *any-handle* handle, java_int i, java_boolean e)
void LLNI_setFloatArrayElement(ExecEnv* ee, *any-handle* handle, java_int i, java_float e)
void LLNI_setPtrArrayElement(ExecEnv* ee, *any-handle* handle, java_int i, void* e)
void LLNI_setLongArrayElement(ExecEnv* ee, *any-handle* handle, java_int i, java_long e)

void LLNI_setDoubleArrayElement(ExecEnv* ee, *any-handle* handle, java_int i, java_double e)
Sets the "i"'th element in array object referenced indirectly by "handle" to the value of "e".

void LLNI_copyValElementsOut(ExecEnv* ee, IArrayOfAny array, java_int startIndex, java_int num, java_byte* buffer)
Copy "num" elements from array to buffer, starting with element at "startIndex". Copies values in "chunks", so GC is not disabled for too long. Can't be used on arrays of objects.

void LLNI_copyValElementsIn(ExecEnv* ee, IArrayOfAny array, java_int startIndex, java_int num, java_byte* buffer)
Copy "num" elements from buffer to array, starting with element at "startIndex". Copies values in "chunks", so GC is not disabled for too long. Can't be used on arrays of objects.

Allocation Operations

```
bool_t LLNI_newInstance(ExecEnv* ee, Ijava_lang_Class cls, any-handle resultHandle)
```
Create new instance of "cls". Store instance in the location pointed to by "resultHandle", which must be a registered location. If allocation fails, store NULL. "resultHandle" must be an *L-value*. This does not call the constructor. Returns TRUE if allocation succeeded, FALSE if out of memory.

```
bool_t LLNI_newArray(ExecEnv* ee, Ijava_lang_Class arrayCls, java_int length, any-handle
resultHandle)
```
Create new array of length "length". "cls" must be an array class. Store instance in the location pointed to by "resultHandle", which must be a registered location. If allocation fails, store NULL. "resultHandle" must be an *L-value*. Returns TRUE is allocation succeeded, FALSE if out of memory.

```
bool_t LLNI_newArrayOf(ExecEnv* ee, Ijava_lang_Class elementCls, java_int length,
any-handle resultHandle)
```
Like LLNI_newArray, except it takes the element class instead of the array class. "elementCls" may be one of the primitive classes. Returns TRUE is allocation succeeded, FALSE if out of memory.

```
bool_t LLNI_clone(ExecEnv* ee, any-handle oldHandle, any-handle newHandle)
```
Allocates a new object that is a bit-wise copy of the old object (except new object will get a new hash code). The copy is done through the write barrier. "newHandle" must be an *L-value*. This does not call the constructor. Returns TRUE if allocation succeeded, FALSE if out of memory.

Local Root Operations

A local root is a location that can be efficiently registered and unregistered in a stack fashion (last in, first out). Local roots are created in blocks, so that all of the roots allocated in a block can be unregistered at once. These operations are defined in "gclocalroots.h".

```
statement-macro beginLocalRoots1(ExecEnv* ee, type1, name1)
```
Allocates a new local root, declares a local handle variable named "name1" with the type "type1", then initializes the handle variable to point to the local root. All following statements until the nearest endLocalRoots statement are said to be in a *local roots block*. The new root is initialized to NULL, so the new handle is a valid but null handle. The local handle variable is declared within the scope of the local roots block - it is not visible after the endLocalRoots statement. beginLocalRootsX statements may be nested.
Warning: You should not execute a return, longjmp, goto, continue, or break statement that would jump out of a local roots block.

```
statement-macro beginLocalRoots2(ExecEnv* ee, type1, name1, type2, name2)
statement-macro beginLocalRoots3(ExecEnv* ee, type1, name1, type2, name2, type3, name3)
statement-macro beginLocalRoots4(ExecEnv* ee, type1, name1, type2, name2, type3, name3,
type4, name4)
statement-macro beginLocalRoots5(ExecEnv* ee, type1, name1, type2, name2, type3, name3,
type4, name4, type5, name5)
```
These macros are like beginLocalRoots1, but they create 2-5 local roots and handle variables.

```
statement-macro endLocalRoots
```
This macro ends a local roots block. All local roots registered since the matching beginLocalRootsX statement are unregistered. This includes any local roots created by DeclareLocalRoot statements in the local roots block.

```
statement-macro rootReturn(type, exp)
```
Use this macro if you need to return from within a region where local roots are in effect. The macro will cancel the local roots before doing a regular return. Note that you cannot use this macro to return a local root defined in the current function! (This can never be done safely!). Type must match both the type of the expression and the return type of the function.

```
statement-macro rootReturnVoid
```
Return for void function from within a local root section.

```
statement-macro DeclareLocalRoot(type, name)
```
Register an additional local root and declare a local handle variable named "name" with the type "type". This macro does not begin a new local root block, but is used within in beginLocalRootsn. The macro can be used only within a local root block.
Warning: `DeclareLocalRoot` should not be used inside a loop, except if the nearest enclosing beginLocalRootsX/endLocalRoots are also nested in the loop (but that is an inefficient use -- it is much better to lift the local root statements out of the loop).

Global Root Operations

Global roots are locations that are registered with the GC. Unlike local roots, the global roots can register and unregister location in any order. Registration and unregistration are both done by means of locations. It is not permitted to register the same location multiple times. These operations are defined in "gcglobalroots.h".

`statement-macro` `DeclareGlobalRoot``(type, name)`
Declare a global root and declare a global handle variable named "name" with the type "type". This does not register the root.

`statement-macro` `DeclareStaticGlobalRoot``(type, name)`
Like DeclareGlobalRoot, but the handle variable is visible only in one file. This does not register the root.

`void` `registerGlobalRoot``(Ijava_lang_Object rootLocation)`
Set the root referred to by "rootLocation" to NULL and register the location as a strong root. "rootLocation" becomes a valid but null handle.

`void` `unregisterGlobalRoot``(Ijava_lang_Object rootLocation)`
Set the root referred to by "rootLocation" to NULL and unregister the location.

`void` `registerGlobalRoots``(Ijava_lang_Object firstRootLocation, java_int num)`
Register an array of "num" global roots at once.

`void` `unregisterGlobalRoots``(Ijava_lang_Object firstRootLocation)`
Unregister an array of global roots at once.

`void` `registerGlobalRootStructs``(Ijava_lang_Object firstRootLocation, java_int num, java_int spacing)`
Register a number of roots at once. The roots are in an array of structs that may contain non-root values.
"rootLocation" must point to the first root in the array.
"num" is the number of roots in the array.
"spacing" is the number of bytes between roots (can use `sizeof(the-struct)`).

`bool_t` `isGlobalRoot``(Ijava_lang_Object rootLocation)`
Returns TRUE if "rootLocation" is registered strong root.

Consistency Operations

The following macros allow handles to be safely dereferenced, and also allow temporarily unregistered handles or direct pointers. Most of the LLNI macros create inconsistent regions under the hood so you don't need to use these macros often. Inconsistent regions may nest.

> Warning: The code in an inconsistent region must follow these rules:
> - Must always execute in bounded (and very short) time.
> - Cannot cause any allocation.
> - Cannot acquire any locks, perform I/O, or other actions that may block the thread indefinitely or require it to synchronize with other threads.
> - Cannot jump out of the inconsistent region by a return, goto, continue, break, or longjmp. The code that ends an inconsistent region must execute.

`statement-macro` `LLNI_beginInconsistent``(ExecEnv* ee)`
All following statements until an `LLNI_endInconsistent` statement will execute in an inconsistent region. You should not execute a return, longjmp, goto, continue, or break statement that would jump out of the inconsistent region.

*statement-macro* LLNI_endInconsistent
This ends an inconsistent region. If this is the outermost inconsistent region and a GC is pending, this will suspend the thread to allow GC to progress.

*statement-macro* LLNI_inconsistentDo(ExecEnv* ee, statements)
Execute "statements" in a region during which no garbage collection will occur. This macro does the equivalent of LLNI_beginInconsistent, your statements, then LLNI_endInconsistent. You should not execute a return, longjmp, goto, continue, or break statement that would jump out of the inconsistent region. The compiler will report any compiler errors for your statements as occurring in LLNI_inconsistentDo, which means that you should keep statements small in order to debug them.

*statement-macro* LLNI_safeExec(statements)
This is an optimized version of LLNI_inconsistentDo. It doesn't actually create an inconsistent region, but instead executes "statements" in a loop. If a GC occurs during the execution of "statements", it is possible for a statement to read a value from where an object used to be. Consequently, some care must be taken when using LLNI_safeExec (if in doubt, it is always safe to use LLNI_inconsistentDo instead). If a GC occurs during the execution of LLNI_safeExec, the macro will execute "statements" as many times as necessary until an execution completes with no intervening garbage collection. "statements" must only contain idempotent operations that don't write to (Java) heap locations. Note that the code in an LLNI_safeExec cannot read (or execute at all) during a GC, so a GC can reverse pointers, set bits in pointers, or otherwise temporarily make the heap unreadable without this being visible to the code in an LLNI_safeExec statement. However, "cascading reads" should be avoided (i.e., reading a reference and then using that reference to read another item), since the first read may fetch an invalid pointer from a location that used to contain a valid pointer. LLNI_safeExec is typically used for things like the LLNI "getter" macros.

bool_t LLNI_isInconsistentEE(ExecEnv* ee)
Return TRUE if this thread is inconsistent.

bool_t LLNI_isInconsistent()
Return TRUE if this thread is inconsistent.

bool_t LLNI_isInconsistentOnceEE(ExecEnv* ee)
Return TRUE if this thread is inconsistent exactly once.

bool_t LLNI_isInconsistentOnce()
Return TRUE if this thread is inconsistent exactly once.

Even lower Level Consistency Operations

A thread running in the bytecode interpreter loop will stay memory inconsistent (see llni.h) most of the time to enable as efficient execution of the bytecodes as possible. (This would be even more true for compiled code, where any inefficiencies incurs a greater relative penalty due to the higher efficiency of the compiled code.)

However, such a thread must at regular (and tightly spaced) intervals offer to become consistent to allow a garbage collection. First, whenever the thread attempts to allocate an object, it must first become memory consistent, since it cannot tell whether the allocation will trigger a garbage collection. Second, to not hold up other threads attempting to allocate objects the thread must become memory consistent within a short of time after being requested to do so.

The LLNI_beginInconsistent etc. macros offer nested inconsistent regions. In the interpreter loop, however, we need no nesting. In fact, we want no nesting: after issuing a become-consistent transition, we REALLY want to be consistent since we are about to perform some operation which requires consistency.

So instead of using the LLNI macros to signal consistency, the interpreter loop uses more efficient non-nesting version. (We have since started using these more efficient macros in selected other places than the interpreter loop).

*statement-macro* CONSISTENT(ExecEnv* ee)

All following statements until an INCONSISTENT statement will execute in an consistent region. The thread must be LLNI_isInconsistentOnceEE, and the executing code must have a stack map. This may allow a GC to continue.

*statement-macro* INCONSISTENT
This ends a consistent region. If this is the outermost inconsistent region and a GC is pending, this will suspend the thread to allow GC to progress.

*statement-macro* CONSISTENT_DO(ExecEnv* ee, statements)
Execute "statements" in a region during which garbage collection *can* occur. You should not execute a return, longjmp, goto, continue, or break statement that would jump out of the consistent region. The thread must be LLNI_isInconsistentOnceEE, and the executing code must have a stack map. The compiler will report any compiler errors for your statements as occurring in CONSISTENT_DO, which means that you should keep statements small in order to debug them.

Pinning Operations

Many garbage collectors reclaim space by moving the objects that are in use to another area and freeing the old area. Other collectors never move objects, and others may or may not move an object depending on it's size, type, etc. You can ask the GC to "pin" an object in place so it won't move, then directly copy data into or out of it without being in an inconsistent region. If the GC refuses to pin the object then fall back on explicit copying. See how the JNI implements GetStringChars for an example.

bool_t LLNI_pinObject(Ijava_lang_Object handle)
If thread is not in an inconsistent region, and the GC allows it, pin the object in memory. Returns TRUE if thread is in an inconsistent region, or if the GC actually set the object's pinned state. Returns FALSE otherwise. Some GC algorithms don't allow pinning, so this might only return TRUE while in an inconsistent region.

void LLNI_unpinObject(Ijava_lang_Object handle)
Ensures that the object referred to by "handle" is not pinned.

bool_t LLNI_isPinnedObject(Ijava_lang_Object handle)
Returns TRUE iff this GC supports pinning and the object referred to by "handle" is pinned.

Unsafe Handle Operations

The following operations get the direct pointer to an object from a handle or set the direct pointer. Safe LLNI operations should be used instead of these where possible.

void LLNI_setHandle(*any-handle* destHandle, *any-ref* unhandedValue)
Make the "destHandle" point to the unhanded value passed in. Must be in an inconsistent region to safely get an unhanded value. If the direct pointer is in a registered location, such as the Java stack, use the following instead:

LLNI_copy(ee, destHandle, LLNI_getHandle(unhandedValue));

which won't require setting up an inconsistent region first.

*any-ref* LLNI_unhand(*any-handle* handle)
Returns a direct pointer to the object referred to by "handle". Must be in an inconsistent region.

Unsafe Array Operations

The following operations deal with direct pointers to the elements in an array. They can only be used on arrays of values, not references. Note that these routines are only useful if the array is pinned, or they are called within an inconsistent region. The static type of the pointer must correspond to the type of the array handle. For example, if the handle's type is IArrayOfChar then the pointer's type must be java_char*.

*pointer* LLNI_getValArrayBody(*any-handle* handle)
Return pointer to array elements. Handle must be pinned or thread must be in an inconsistent region.

*pointer* LLNI_getPinnedValArrayPtr(*any-handle* array, java_int offset)
If this array can be pinned (either because the GC allows pinning or we are in an inconsistent region), return a direct pointer to the element at integer "offset" from the start of the body of "array". Return "NULL" otherwise.

bool_t LLNI_isPinnedValArrayPtr(*any-handle* array, *pointer* ptr)
Returns TRUE if "array" is pinned and "ptr" points to the body of the array.

void LLNI_releasePinnedValArrayPtr(*any-handle* array, *pointer* ptr)
Unpins "array".

Examples Section

Getting and Setting a Value Field

This code gets an int from the "this" object, calls a function with some parameters, then stores the result back into the same field of the object.

```
void
foo(ExecEnv* ee, Ijava_util_zip_CRC32 this, java_int b)
{
    Bytef buf[1];
    java_int initCRC, newCRC;

buf[0] = b;
    LLNI_getIntField(this, crc, initCRC);
    newCRC = crc32(initCRC, buf, 1);
    LLNI_setIntField(ee, this, crc, newCRC);
}
```

Get a Reference Field and return value from function

This is an example (from src/share/java/runtime/threadruntime.c) of using the convention of an extra result argument instead of a result value.

Using the LLNI, the caller is responsible for allocating a registered location (usually a local root). The callee simply sets that location to refer to the same object that the "name" field refers to.

```
void
getThreadName(IArrayOfChar threadNameResult)
{
    LLNI_getRefField(ee, threadSelf(), name, threadNameResult);
}
```

Using beginLocalRoots

This is an example (from src/share/java/runtime/threadruntime.c). It gets a Java string out of the thread object and calls a core VM routine to generate a C string from the Java string.

```
char *
plainThreadName(Ijava_lang_Thread thr) {
    char *result;
    sysAssert(LLNI_isValidHandle((Ijava_lang_Object)thr));
    beginLocalRoots1(EE(), IArrayOfChar, thrName);
        LLNI_getRefField(ee, thr, name, thrName);
        result = Object2CString((Ijava_lang_Object)thrName);
    endLocalRoots;
    return result;
}
```

What is claimed is:

1. A method for managing memory resources corresponding to objects in a system, comprising:
   executing a program component including a set of instructions native to the system, the set including an instruction to maintain information on use of a particular object; and
   permitting reuse of memory resources corresponding to the particular object based on an indication from a source that the particular object is no longer being used, the source being different from any source used to provide information on use of objects associated with non-native instructions of the program component.

2. The method of claim 1, wherein the system includes a runtime environment for executing the program component, and wherein permitting reuse of memory resources includes
   invoking a garbage collector of the runtime environment.

3. The method of claim 2, wherein invoking a garbage collector includes
   implementing an exact garbage collection algorithm.

4. The method of claim 1, wherein permitting reuse of memory resources includes
   using a stack associated with the native instructions.

5. The method of claim 1, wherein permitting reuse of memory resources includes
   using a linked list associated with the native instructions.

6. A method for managing memory resources corresponding to objects in a system, comprising:
   executing a program component including a set of instructions native to the system, wherein the set of native instructions includes an instruction to synchronize a garbage collector with the program component; and
   preventing, in response to execution of the synchronize instruction, the garbage collector from permitting reuse of memory resources corresponding to a particular object until after operation of certain native instructions.

7. The method of claim 6, wherein the instruction to synchronize a garbage collector with the set of native instructions includes
   setting an inconsistency bit in a data structure associated with the program component.

8. The method of claim 6, further comprising:
   signaling the garbage collector to permit reuse of memory resources corresponding to a particular object after operation of certain native instructions.

9. The method of claim 8, wherein the instruction to synchronize a garbage collector with the set of native instructions includes
   setting an inconsistency bit in a data structure associated with the program component.

10. The method of claim 8, wherein signaling the garbage collector includes resetting the inconsistency bit.

11. A method for managing memory resources corresponding to objects in a system, comprising:
    providing a program component including a set of instructions native to the system, wherein the set of native instructions includes an instruction to synchronize a garbage collector with the program component; and
    signaling the garbage collector to postpone a start of a collection process until after operation of certain native instructions in response to the synchronize instruction.

12. A memory for managing memory resources corresponding to objects in a system, the memory comprising:
    a set of instructions native to the system, the set including an instruction to maintain information on use of a particular object; and
    an interface with code for permitting reuse of memory resources corresponding to the particular object based on an indication from a source that the particular object is no longer being used, the source being different from any source used to provide information on use of objects associated with non-native instructions.

13. A computer-implemented method for managing resources corresponding to objects in a memory, comprising:
    executing a program component including a set of instructions native to the system, the set including an instruction to maintain information on use of a particular object; and
    relocating another object in the memory based on an indication from a source that the particular object is no longer being used, the source being different from any source used to provide information on use of objects associated with non-native instructions of the program component.

14. The method of claim 13, further comprising:
    updating a data structure referencing the relocated object with its new location.

15. A method for managing memory resources corresponding to objects in a system having an abstract computing machine, comprising:
    executing a program component including first instructions native to the system and second instructions targeted to the abstract computing machine, wherein the first and second instructions include references to objects representing memory resources;
    managing object references for the second instructions in a data structure; and
    managing object references for the first instructions in a linked list distinct from the data structure for managing object references for the second instructions.

16. The method of claim 15, further comprising:
    invoking a garbage collection process to reclaim memory resources corresponding to objects based on information from both the data structure for object references for the second instructions and the linked list for object references for the first instructions.

17. The method of 16, wherein invoking the garbage collection process includes
    reclaiming the memory resources for a particular object when an indication exists that memory resources must be reclaimed to perform an instruction to allocate another object and it is determined that the second instructions and the first instructions no longer require the memory resources for the particular object.

18. A system for managing memory resources corresponding to objects, comprising:
    a memory having a program component including a set of instructions native to the system, the set including an instruction to maintain information on use of a particular object; and
    a processor configured to permit reuse of memory resources corresponding to the particular object based on an indication from a source that the particular object is no longer being used, the source being different from any source used to provide information on use of objects associated with non-native instructions of the program component.

19. The system of claim 18, wherein the processor is further configured to invoke a garbage collector.

20. The system of claim 19, wherein the garbage collector implements an exact garbage collection algorithm.

21. The system of claim 18, wherein the source is a stack associated with the native instructions.

22. The system of claim 18, wherein the source is a linked list associated with the native instructions.

23. A system for managing memory resources corresponding to objects, comprising:
a memory having a program component including a set of instructions native to the system, wherein the set of native instructions includes an instruction to synchronize a garbage collector with the set of native instructions; and
a processor configured to prevent, in response to the synchronize instruction, the garbage collector from permitting reuse of memory resources corresponding to a particular object until after operation of certain native instructions.

24. The system of claim 23, wherein the processor is further configured to set an inconsistency bit in a data structure associated with the program component.

25. The system of claim 23, wherein the processor is further configured to signal the garbage collector to permit reuse of memory resources corresponding to a particular object after operation of certain native instructions.

26. The system of claim 25, wherein the processor is further configured to set an inconsistency bit in a data structure associated with the program component.

27. The system of claim 25, wherein processor is further configured to reset the inconsistency bit.

28. A system for managing memory resources corresponding to objects, comprising:
a memory having a program component including a set of instructions native to the system, the set of native instructions including an instruction to synchronize a garbage collector with the set of native instructions; and
a processor configured to signal the garbage collector to postpone a start of a collection process until after operation of certain native instructions in response to the synchronize instruction.

29. A system for managing memory resources corresponding to objects, comprising:
a memory having a program component including a set of instructions native to the system, the set including an instruction to maintain information on use of a particular object; and
a processor configured to relocate another object based on an indication from a source that the particular object is no longer being used, the source being different from any source used to provide information on use of objects associated with non-native instructions of the program component.

30. The system of claim 29, wherein the processor is further configured to update a data structure referencing the relocated object with its new location.

31. The system of claim 29, wherein the processor is further configured to invoke a garbage collector.

32. A system for managing memory resources corresponding to objects and having an abstract computing machine, comprising:
a memory having a program component including first instructions native to the system and second instructions targeted to the abstract computing machine, wherein the first and second instructions use references to objects representing memory resources; and
a processor configured to manage object references for the second instructions in a data structure and object references for the first instructions in a linked list distinct from the data structure for managing object references for the target instructions.

33. The system of claim 32, wherein the processor is further configured to invoke a garbage collection process to reclaim memory resources corresponding to objects based on information from both the data structure for object references for the second instructions and the linked list for object references for the first instructions.

34. The system of 33, wherein the processor is further configured to reclaim the memory resources for a particular object when an indication exists that memory resources must be reclaimed to implement an instruction to allocate another object and it is determined that the second instructions and the first instructions no longer require the memory resources for the particular object.

35. A computer-readable medium containing instructions to perform a method for controlling a data processing system to manage memory resources corresponding to objects in the data processing system, the method comprising:
executing a program component including a set of instructions native to the system, the set including an instruction to maintain information on use of a particular object; and
permitting reuse of memory resources corresponding to the particular object based on an indication from a source that the particular object is no longer being used, the source being different from any source used to provide information on use of objects associated with non-native instructions of the program component.

36. The computer-readable medium of claim 35, wherein the data processing system includes a runtime environment for executing the program component, and wherein permitting reuse of memory resources includes
invoking a garbage collector of the runtime environment.

37. The computer-readable medium of claim 36, wherein invoking a garbage collector includes
implementing an exact garbage collection algorithm.

38. The computer-readable medium of claim 35, wherein the source is a stack associated with the native instructions.

39. The computer-readable medium of claim 35, wherein the source is a linked list associated with the native instructions.

40. A computer-readable medium containing instructions to perform a method for controlling a data processing system to manage memory resources corresponding to objects in the data processing system, the method comprising:
providing a program component including a set of instructions native to the system;
including in the set of native instructions an instruction to synchronize a garbage collector with the set of native instructions; and
preventing, in response to the synchronize instruction, the garbage collector from permitting reuse of memory resources corresponding to a particular object until after operation of certain native instructions.

41. The computer-readable medium of claim 40, wherein the instruction to synchronize a garbage collector with the set of native instructions includes
setting an inconsistency bit in a data structure associated with the program component.

42. The computer-readable medium of claim 40, wherein the method further comprises:
signaling the garbage collector to permit reuse of memory resources corresponding to a particular object after operation of certain native instructions.

43. The computer-readable medium of claim 42, wherein the instruction to synchronize a garbage collector with the set of native instructions includes setting an inconsistency bit in a data structure associated with the program component.

44. The computer-readable medium of claim 42, wherein signaling the garbage collector includes resetting the inconsistency bit.

45. A computer-readable medium containing instructions to perform a method for controlling a data processing system to manage memory resources corresponding to objects in the data processing system, the method comprising:

providing a program component including a set of instructions native to the system;

including in the set of native instructions an instruction to synclronize a garbage collector with the set of native instructions; and signaling the garbage collector to postpone a start of a collection process until after operation of certain native instructions in response to the synchronize instruction.

46. A computer-readable medium containing instructions to perform a method for controlling a data processing system to manage memory resources corresponding to objects in the data processing system, the method comprising:

executing a program component including a set of instructions native to the system, the set including an instruction to maintain information on use of a particular object; and relocating another object based on an indication from a source that the particular object is no longer being used, the source being different from any source used to provide information on use of objects associated with non-native instructions of the program component.

47. The computer-readable medium of claim 46, wherein the method further comprises:

updating a data structure referencing the relocated object with its new location.

48. A computer-readable medium containing instructions to perform a method for controlling a data processing system to manage memory resources corresponding to objects in the data processing system, the method comprising:

executing a program component including instructions native to the system and instructions targeted to the abstract computing machine, wherein the instructions include references to objects representing memory resources;

managing object references for the target instructions in a data structure; and managing object references for the native instructions in a linked list distinct from the data structure for managing object references for the target instructions.

49. The computer-readable medium of claim 48, wherein the method further comprises:

invoking a garbage collection process to reclaim memory resources corresponding to objects based on information from both the data structure for object references for the target instructions and the linked list for object references for the native instructions.

50. The computer-readable medium of 49, wherein invoking the garbage collection process includes reclaiming the memory resources for a particular object when an indication exists that memory resources must be reclaimed to implement an instruction to allocate another object and it is determined that the target instructions and the native instructions no longer require the memory resources for the particular object.

51. A system for managing memory resources corresponding to objects, comprising:

means for executing a program component including a set of instructions native to the system, the set including an instruction to maintain information on use of a particular object; and means for permitting reuse of memory resources corresponding to the particular object based on an indication from a source that the particular object is no longer being used, the source being different from any source used to provide information on use of objects associated with non-native instructions of the program component.

52. A memory device encoded with a data structure used for managing system resources for a thread executing in a computer and including a set of instructions native to the computer and a set of instructions targeted to an abstract computer machine operating in the computer, the data structure comprising:

a first field with an identifier for a memory area for holding references to objects used in the native instructions;

a second field with an identifier for a different memory area for holding references to objects used in the target instructions; and an inconsistency bit that, when set, prevents a garbage collector from permitting reuse of memory resources corresponding to a particular object until after operation of certain native instructions.

* * * * *

UNITED STATES PATENT AND TRADEMARK OFFICE
CERTIFICATE OF CORRECTION

PATENT NO.    : 6,253,215 B1
DATED         : June 26, 2001
INVENTOR(S)   : Ole Agesen and David L. Detlefs It is certified that error appears in the above-identified patent and that said Letters Patent is hereby corrected as shown below:

<u>Column 44,</u>
Line 43, "method of 16" should read -- method of claim 16 --;

<u>Column 46,</u>
Line 10, "system of 33" should read -- system of claim 33 --; and <u>Column 47,</u>
Line 17, "synclronize" should read -- synchronize --.

Signed and Sealed this

Ninth Day of July, 2002

*Attest:*

*Attesting Officer*

JAMES E. ROGAN
*Director of the United States Patent and Trademark Office*